United States Patent
Okabayashi et al.

(10) Patent No.: US 6,721,462 B2
(45) Date of Patent: Apr. 13, 2004

(54) IMAGE PROCESSING UNIT

(75) Inventors: Keiju Okabayashi, Kawasaki (JP);
Naoyuki Sawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 630 days.

(21) Appl. No.: 09/769,521

(22) Filed: Jan. 26, 2001

(65) Prior Publication Data

US 2001/0022859 A1 Sep. 20, 2001

(30) Foreign Application Priority Data

Feb. 18, 2000 (JP) ........................................ 2000-040833

(51) Int. Cl.[7] .................................................. G06K 9/64
(52) U.S. Cl. ........................ 382/278; 382/305; 708/424
(58) Field of Search ................................ 382/305, 278, 382/307, 209, 218, 181; 708/5, 422, 424, 490, 501, 605, 813; 707/6

(56) References Cited

U.S. PATENT DOCUMENTS 5,189,712 A * 2/1993 Kajiwara et al. ........... 382/278
5,768,404 A * 6/1998 Morimura et al. .......... 382/107
6,088,483 A * 7/2000 Nakano et al. ............. 382/278

FOREIGN PATENT DOCUMENTS

| JP | HEI 5-114028 | 5/1993 |
| JP | HEI 5-189570 | 7/1993 |

* cited by examiner

*Primary Examiner*—Phuoc Tran
(74) *Attorney, Agent, or Firm*—Staas & Halsey LLP

(57) ABSTRACT

In an image processing unit for performing an arithmetic operation between a reference image and a search image, a product-sum operation section comprises systoric array, a normalization and accumulation processing section and a correlation value memory control section. The product-sum operation section is used on a common basis for an operation for the addition of a square of a pixel value of a search image over a plurality of pixels and an operation for the addition of a multiplication of pixel values of pixels associated with the search image and the reference image over a plurality of pixels. An operation for a norm of the reference image is performed on a path (a reference image norm computing section) which is different from that of the product-sum operation section.

13 Claims, 31 Drawing Sheets

```
     0  1  2  3  4  5  6  7  8  9 10 11 12 13 14 15
   ┌──┬──┬──┬──┬──┬──┬──┬──┬──┬──┬──┬──┬──┬──┬──┬──┐
 0 │  │  │  │  │  │  │  │  │  │  │  │  │  │  │  │  │
   ├──┼──┼──┼──┼──┼──┼──┼──┼──┼──┼──┼──┼──┼──┼──┼──┤
```

Y(i, j)

IMAGE PROCESSING UNIT

BACKGROUND OF THE INVENTION

Field of the Invention

The present invention relates to an image processing unit for performing an arithmetic operation between a reference image and a search image. Description of the Related Art Hitherto, there is known an apparatus for continuously tracking an object moving in a picture plane photographed by a television camera or a video camera. Such an apparatus for tracking a moving object is widely applicable to the fields as set forth below, for example:

(1) visualization of movement measurement and movement vector of non-contact (2) automation of monitor and observation (3) automatic recognition of gesture, expression and one's eyes (4) camera control of movie photography and sport relay broadcasting (5) control of mobile robot and autonomic traveling car In the event that the above-mentioned apparatus is used to recognize a position of a moving object, there is adopted a scheme that a pattern, which is the same as a pattern represented by a reference image or the similar pattern to the pattern represented by the reference image, is searched from a search image. For determination as to whether the pattern is identical or similar, there is often used an arithmetic method referred to as a correlation arithmetic operation.

FIG. 1 is an explanatory view useful for understanding a principle of a movement tracking processing by a correlation arithmetic operation.

A search image, which is derived through an image sensor 11 equipped with a television camera and a video camera, is converted by an A/D converter 12 into a search image represented by digital data, and then stored in a search image memory 13. On the other hand, a reference image memory 14 stores therein a reference image which is set up fixedly beforehand or cut out from a past search image.

The search image and the reference image are read out from the search image memory 13 and the reference image memory 14, respectively, in accordance with address information generated from an address generator 15, and then transferred to a correlation arithmetic unit 16. In the correlation arithmetic unit 16, a correlation arithmetic operation, which will be described later, is performed, so that correlation values associated pixels of the search image thus obtained are fed to a correlation value peak position detector 17 to detect a peak position of the correlation value. The peak position has an identical or similar to the pattern of the reference image on the search image. The peak position detected by the correlation value peak position detector 17 is outputted to the exterior in form of information representative of a position of a moving object on the search image at the present time, and is fed back to the address generator 15. That is, the peak position detected by the correlation value peak position detector 17 is transmitted to the address generator 15 so that a search can be performed on a certain area taking the peak position (the position of the moving object on the search image at the present time point) detected at the present time, when the position of the moving object on the search image at the subsequent time is searched.

FIG. 2 is a view representative of a pixel division of a reference image. FIG. 3 is a view showing an example of a pattern on the reference image. FIG. 4 is a view representative of a pixel division of a search image. FIG. 5 is a view showing an example of a pattern on the search image. FIG. 6 is an explanatory view useful for understanding a correlation arithmetic processing between the reference image and the search image. FIG. 7 is a typical illustration showing a distribution of correlation values.

Here, for the purpose of simplification, it is assumed that the reference image is of 8×8 pixels as shown in FIG. 2, and a pixel value of a pixel of coordinates (i, j) is expressed by X (i, j). In a similar fashion to this, it is assumed that the search image is of 16×16 pixels as shown in FIG. 4, and a pixel value of a pixel of coordinates (i, j) is expressed by Y (i, j).

Here, as shown in FIG. 6, a partial area image (here, typically, a partial area image area taking coordinates (m, n) as the center) of the same size as the reference image is cut out from the search image, and the correlation value D (m, n) is computed in accordance with the following formula (1).

$$D(m, n) = \frac{\sum_{i=0}^{7} \sum_{j=0}^{7} \{Y(m+i, n+j) \times X(i, j)\}}{\sqrt{\sum_{i=0}^{7} \sum_{j=0}^{7} (X(i, j))^2} \sqrt{\sum_{i=0}^{7} \sum_{j=0}^{7} (Y(m+i, n+j))^2}} \quad (1)$$

where the denominator of the formula (1), that is, the parts set forth below are quantities referred to as norm of the reference image and norm of the search image, respectively.

$$\sqrt{\sum_{i=0}^{7} \sum_{j=0}^{7} (X(i, j))^2} , \sqrt{\sum_{i=0}^{7} \sum_{j=0}^{7} (Y(m+i, n+j))^2}$$

This arithmetic operation is sequentially performed while m and n are altered in the range of m=0 to 7, and n=0 to 7, respectively, as shown in FIG. 6. Thus, a distribution of the correlation values as shown in FIG. 7 is determined. Detection of the peak position of the correlation values makes it possible to detect a position wherein a pattern, which is identical or similar to the pattern (cf. FIG. 3 for example) of the reference image, exists on the search image (cf. FIG. 5 for example).

The formula (1) is representative of a correlation arithmetic operation referred to as a so-called normalized correlation. According to the conventional technology, however, there is a need to prepare a very large scale circuit to execute the normalized correlation arithmetic operation.

In view of the foregoing, Japanese Patent Laid Open Gazettes Hei. 5-114028 and Hei. 5-189570 disclose a technology of reducing a scale of a circuit for performing the normalized correlation arithmetic operation. The technology disclosed the above-referenced Gazettes is to compress a two-dimensional image to a one-dimensional image through producing a projection histogram or addition of intensity values to an x-direction or a y-direction, so that an arithmetic operation for the normalized correlation is performed on the one-dimensional image. Thus, it is possible to greatly reduce a circuit scale since it is sufficient that the normalized correlation is performed on the one-dimensional image. However, there is a possibility that information is dropped in the process in which two-dimensional image is compressed to the one-dimensional image, and thus there is a possibility that accuracy of a position detection of a moving object is lowered.

Further, there is known a so-called SAD(Sum of Absolute Difference), instead of the normalized correlation of the formula (1), in which the correlation arithmetic operation is performed in accordance with the following formula (2).

$$D(m, n) = \sum_{i=0}^{7} \sum_{j=0}^{7} |Y(m+i, n+j) - X(i, j)| \quad (2)$$

where m=0~7, n=0~7

As a circuit for performing the SAD, it is possible to use a circuit which is greatly smaller in a circuit scale as compared with a circuit for performing the normalized correlation.

In case of the SAD, when the pattern of the search image is completely coincident with the pattern of the reference image, there is obtained D(m, n)=0. Thus, a position of the minimum peak value of D(m, n) obtained through the formula (2) is detected.

However, the SAD brings about great degradation in arithmetic accuracy when luminance of the search image is varied (for example, the moving object enters the shade), and thus in general the SAD involves a problem that it is greatly poor in a position detection ability for the moving object as compared with the normalized correlation. Accordingly, it is restricted to an especial case such as under condition that luminance of the search image is constant that accuracy of the same degree as the normalized correlation is ensured.

SUMMARY OF THE INVENTION

In view of the foregoing, it is an object of the present invention to provide an image processing unit capable of performing a normalized correlation maintaining a two-dimensional image with a smaller circuit scale as compared with the conventional one.

To achieve the above-mentioned objects, the present invention provides an image processing unit for performing an arithmetic operation between a reference image and a search image, upon receipt of the reference image and the search image, said image processing unit having an image processing section comprising:

a first multiplication section for computing a square of a pixel value of the reference image;

an addition section for adding square value of the pixel values of the reference image obtained by said first multiplication section over a plurality of pixels;

a first square root computing section for computing a square root of an additional value over a plurality of pixels of the square value of the pixel values of the reference image obtained by said addition section to determine a norm of the reference image;

a product-sum operation section used on a common basis for both an addition of square values of pixel values of the search image over a plurality of pixels and an addition of multiplication values of pixel values of pixels associated with the search image and the reference image over a plurality of pixels;

a second square root computing section for computing a square root of an additional value over a plurality of pixels of the square value of the pixel values of the search image obtained by said product-sum operation section to determine a norm of the search image;

a second multiplication section for multiplying the norm of the reference image obtained by said first square root computing section and the norm of the search image obtained by said second square root computing section together; and a division section for dividing an additional value of multiplication values of pixel values of pixels associated with the search image and the reference image over a plurality of pixels obtained by said product-sum operation section by a multiplication value between the norm of the reference image and the norm of the search image obtained by said second multiplication section to obtain a normalization correlation value.

According to the image processing unit of the present invention as mentioned above, the product-sum operation section is used on a common basis for an operation for the addition of a square of a pixel value of a search image over a plurality of pixels and an operation for the addition of a multiplication of pixel values of pixels associated with the search image and the reference image over a plurality of pixels. An operation for a norm of the reference image is performed on a path (a path including a first multiplication section, an addition section and a first square root computing section) which is different from that of the product-sum operation section. Thus, according to the image processing unit of the present invention, it is possible to reduce the scale of a circuit and to perform the operation processing in form of the two-dimensional image.

In the image processing unit according to the present invention as mentioned above, it is preferable that said first multiplication section and said second multiplication section are used on a common basis by a single multiplication section. Alternatively, it is preferable that said first square root computing section and said second square root computing section are used on a common basis by a single square root computing section.

A circuit arrangement, in which the multiplication section or the square root computing section is used on a common basis, makes it possible to more reduce the circuit scale.

In the image processing unit according to the present invention as mentioned above, it is preferable that said product-sum operation section has a mode in which instead of the addition of multiplication values of pixel values of pixels associated with the search image and the reference image over a plurality of pixels, an addition of absolute values of differences between pixel values of pixels associated with the search image and the reference image over a plurality of pixels is performed.

The adoption of the modes as mentioned above makes it possible to perform the SAD correlation as well as the normalization correlation using the image processing unit of the present invention.

In the image processing unit according to the present invention as mentioned above, it is preferable that said division section has a mode in which instead of a division by a multiplication value between the norm of the reference image and the norm of the search image obtained, a division is performed by a predetermined constant.

In this case, it is also preferable that said image processing section further comprises an absolute value computing section for computing an absolute value of a value obtained by said division section.

The numerator of the above-mentioned formula (1) represents a spatial filtering operation when a filter operator is adopted as a reference image.

Thus, in the event that the division section has the mode concerning with the division by a predetermined constant value, it is possible to perform the spatial filtering operation expressed by the following formula (3).

$$D(m, n) = \frac{\sum_{i=0}^{7}\sum_{j=0}^{7}\{Y(m+i, n+j) \times X(i, j)\}}{C} \quad (3)$$

where m=0~7, n=0~7, and C is constant

Alternatively, in the event that a function as a spatial filter is provided even if a division is performed by the constant value, it is acceptable that the division section is bypassed.

An adoption of the absolute value computing section makes it possible to cope with the spatial filtering operation involving the absolute value operation, for example, a spatial filtering operation using the Sobel operator.

In the image processing unit according to the present invention as mentioned above, it is preferable that said image processing section further comprises a peak detection section for detecting a peak position on the search image as to the normalization correlation value obtained by said division section.

The image processing unit according to the present invention is basically an apparatus for performing a correlation operation, and thus it is acceptable that a peak detection of a correlation value is performed outside the apparatus as occasion demands. Alternatively, it is also acceptable that as mentioned above, a peak detection section is incorporated so that a peak position of a correlation value is detected within the image processing unit.

In the image processing unit as mentioned above, it is preferable that said product-sum operation section has a mode in which instead of the addition of multiplication values of pixel values of pixels associated with the search image and the reference image over a plurality of pixels, an addition of absolute values of differences between pixel values of pixels associated with the search image and the reference image over a plurality of pixels is performed, and said peak detection section detects a peak position on the search image as to the addition of absolute values in said mode.

This feature makes it possible to detect the peak position through performing the SAD correlation.

In the image processing unit according to the present invention as mentioned above, it is preferable that said product-sum operation section has a systoric array for performing an operation between all of a plurality of bits representative of one pixel value when pixel values are expressed by a plurality of bits, and a part of bits belonging to one group when a plurality of bits representative of another pixel value is divided into a plurality of groups, and said systoric array assembles an operation result between said one pixel value and said another pixel value in accordance with a plurality of operation results obtained through a sequential operation on said plurality of groups.

Hitherto, there is known a systoric array as a suitable circuit structure for performing the product-sum operation. However, as mentioned above, when there is provided such an arrangement that an arithmetic operation between one pixel value and another pixel is divided into a plurality of partial arithmetic operations and is performed, so that a plurality of partial operation results are combined, it is possible to greatly reduce a circuit scale of the systoric array.

Further, in the image processing unit according to the present invention as mentioned above, it is preferable that said image processing section further comprises:

a first fixed-point achieving processing section for providing such a processing that when the additional value of the square value of the pixel values of the reference image over a plurality of pixels, which are obtained by said addition section, is such a small value that zeros are put at an upper significant bit end of a plurality of bits representative of the additional value, the additional value represented by the plurality of bits is shifted to the upper significant bit end so that a decimal point position is shifted to the upper significant bit end to transfer the same to said first square root computing section;

a second fixed-point achieving processing section for providing such a processing that when the additional value of the square value of the pixel values of the search image over a plurality of pixels, which are obtained by said product-sum operation section, is such a small value that zeros are put at an upper significant bit end of a plurality of bits representative of the additional value, the additional value represented by the plurality of bits is shifted to the upper significant bit end so that a decimal point position is shifted to the upper significant bit end to transfer the same to said second square root computing section; and a third fixed-point achieving processing section for providing such a processing that the additional value of multiplication values of pixel values of pixels associated with the search image and the reference image over a plurality of pixels, which are obtained by said product-sum operation section, said additional value being expressed by a plurality of bits, is shifted to the upper significant bit end by a shift amount according to a shift amount in said first fixed-point achieving processing section and a shift amount in said second fixed-point achieving processing section so that a decimal point position is shifted to the upper significant bit end to transfer the same to said division section.

Provision of the first fixed-point achieving processing section, the second fixed-point achieving processing section and the third fixed-point achieving processing section makes it possible to perform a division with greater accuracy when a division between the smaller values is performed.

In the event that there is obtained such a small value that there is a possibility that even provision of the first fixed-point achieving processing section, the second fixed-point achieving processing section and the third fixed-point achieving processing section brings about a great degradation in accuracy of the division, it is acceptable that an alarm is issued.

In the image processing unit according to the present invention as mentioned above, it is preferable that said image processing section repeats by a plurality of number of times a partial operation according to a part of data of data representative of the reference image and the search image so that an operation according to the reference image and the search image are completed, and wherein said image processing section further comprises:

a cache memory for storing the search image; and a memory control section for providing such a control that while data representative of the search image is stored in said cache memory, data necessary for a partial operation for the first time of data representative of the search image is transferred to said image processing section, and with respect to two or more partial operations based on the same search image, necessary data is read from said cache memory to transfer the same to said image processing section.

In the event that the cache memory is provided, and with respect to two or more partial operations, necessary data is read from said cache memory, it is possible to reduce an idle time between the partial operations and thereby implementing a high speed processing.

In the image processing unit according to the present invention as mentioned above, it is preferable that said image processing unit further comprises a image memory having a plurality of frame memories each for storing a frame of search image, and a memory control section for providing such a control that the plurality of frame memories are used on a circulation basis so that an entered search image is stored in each of the frame memories one frame by one frame.

This feature makes it possible to always utilize the newest plurality of frame of search image. For example, with respect to a mobile object fast in movement, a mobile object, which appears on a search image immediately before the present search image, is derived to be a reference image. On the other hand, with respect to a mobile object slow in movement, a mobile object, which appears on the previous search image far from the present search image by a plurality of frames, is derived to be a reference image. A correlation operation is performed between the reference image thus obtained and the present search image. This feature makes it possible to determine a mobile vector of the mobile object with greater accuracy, even if it is concerned with a system in which both the mobile object fast in movement and the mobile object slow in movement simultaneously exist.

Further, in the image processing unit according to the present invention as mentioned above, it is preferable that said image processing section comprises an operation command storage section for sequentially storing a plurality of operation commands, and an operation result storage section for sequentially storing a plurality of operation results, and said image processing section derives the operation command from said operation command storage section to perform an arithmetic operation in accordance with the operation command and causes a result of the arithmetic operation to be stored in said operation result storage section, said image processing unit further comprises an image processing control section having two modes of a first mode in which the operation command is fed to said image processing section so as to be stored in said operation command storage section, and a second mode in which the operation result stored in said operation result storage section is derived, and said image processing control section changes over from the first mode to the second mode when said operation result storage section is full, and changes over from the second mode to the first mode when said operation command storage section is empty.

This feature makes it possible to avoid the deadlock (a state that the transfer of the operation command and the operation result between the image processing section and the image processing control section cannot be performed) between the image processing section and the image processing control section, and thereby implementing a smooth transfer of the operation command and the operation result.

DETAILED DESCRIPTION OF PREFERRED EMBODIMENTS

Embodiments of the present invention will be described with reference to the accompanying drawings.

Figure 8:
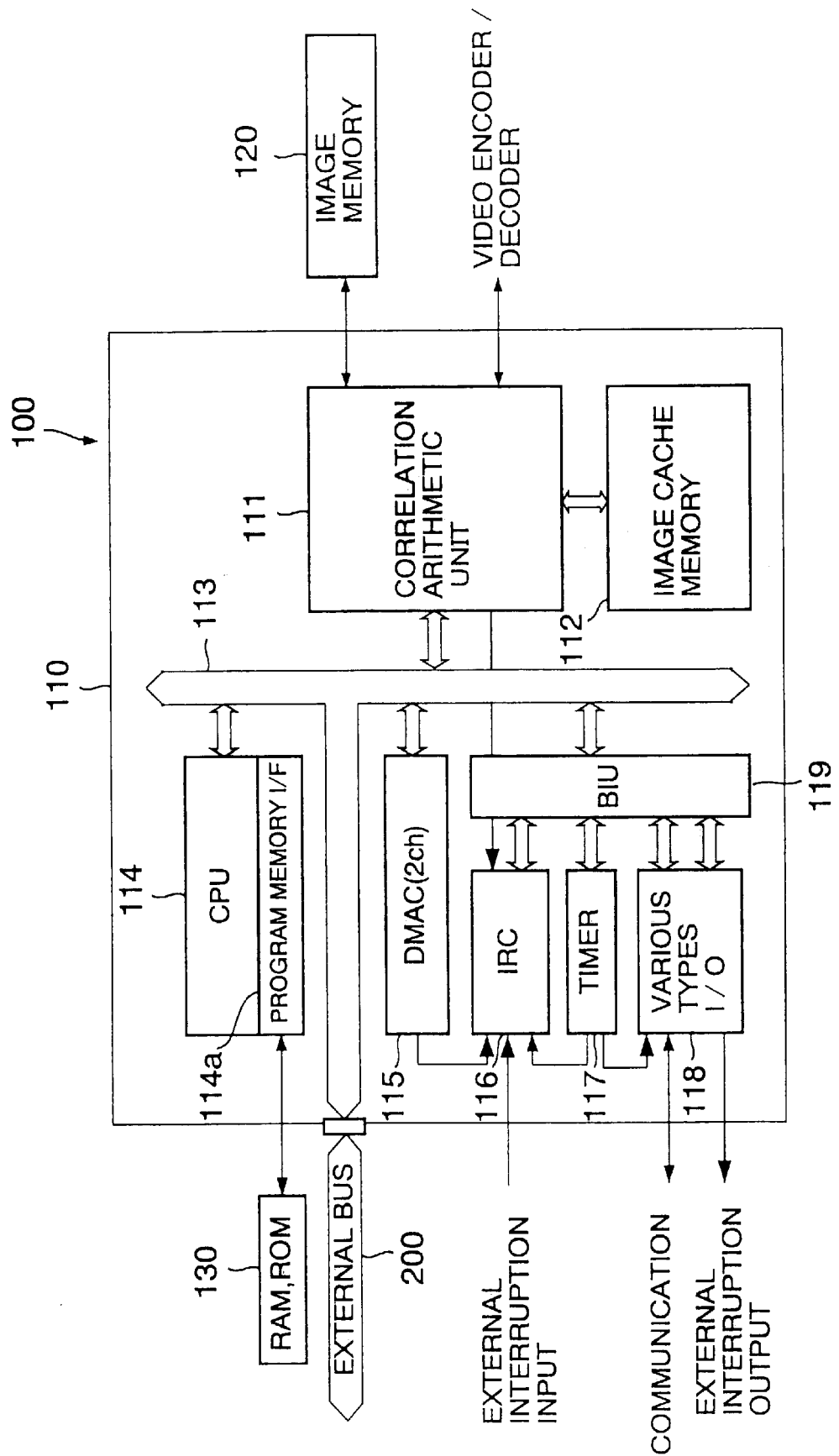
FIG. 8 is a schematic construction view of an image processing unit according to an embodiment of the present invention.

FIG. 8 is a schematic construction view of an image processing unit according to an embodiment of the present invention.

An image processing unit 100 comprises an LSI 110, an image memory 120 connected to the LSI 110, and a memory 130 comprising RAM and ROM, which is also connected to the LSI 110.

Inside the LSI 110, there is provided a correlation image processing device 111 which constitutes the main part of the image processing unit according to the embodiment of the present invention. The correlation image processing device 111 writes image data fed from video encoder/decoder into the image memory 120, reads the image data from the image memory 120 to store the same into a cache memory 112, and further reads the image data from the image memory 120 and the cache memory 112 to perform a correlation arithmetic operation. Details will be described latter.

The correlation image processing device 111 is connected via a bus 113 to a CPU 114. The CPU 114 is connected via a programming memory interface 114a to the memory 130, and transmits to the correlation image processing device 111 an arithmetic command to instruct a mode of an arithmetic operation and the like to be executed in the correlation image processing device 111 and receives an arithmetic operation result obtained by the correlation image processing device 111 to perform various types of operation and control under a control of two channels of DMA controllers 115 connected to the bus 113. One of two channels of the DMA controllers 115 is used for transmission of the arithmetic command from the CPU 114 to the correlation image processing device 111, and another channel is used for transmission of the arithmetic operation result from the correlation image processing device 111 to the CPU 114. An interruption control section 116 performs an interruption control upon receipt of an interruption from the correlation image processing device 111, the DMA controllers 115, a timer 117 and the exterior. A various type of I/O 118 is available to communications with the exterior and interruptions to the exterior. The interruption control section 116, the timer 117 and the various type of I/O 118 are connected via a bus interface 119 to the bus 113. The bus 113 is connectable to an external bus 200 to provide an expansion.

Figure 9:
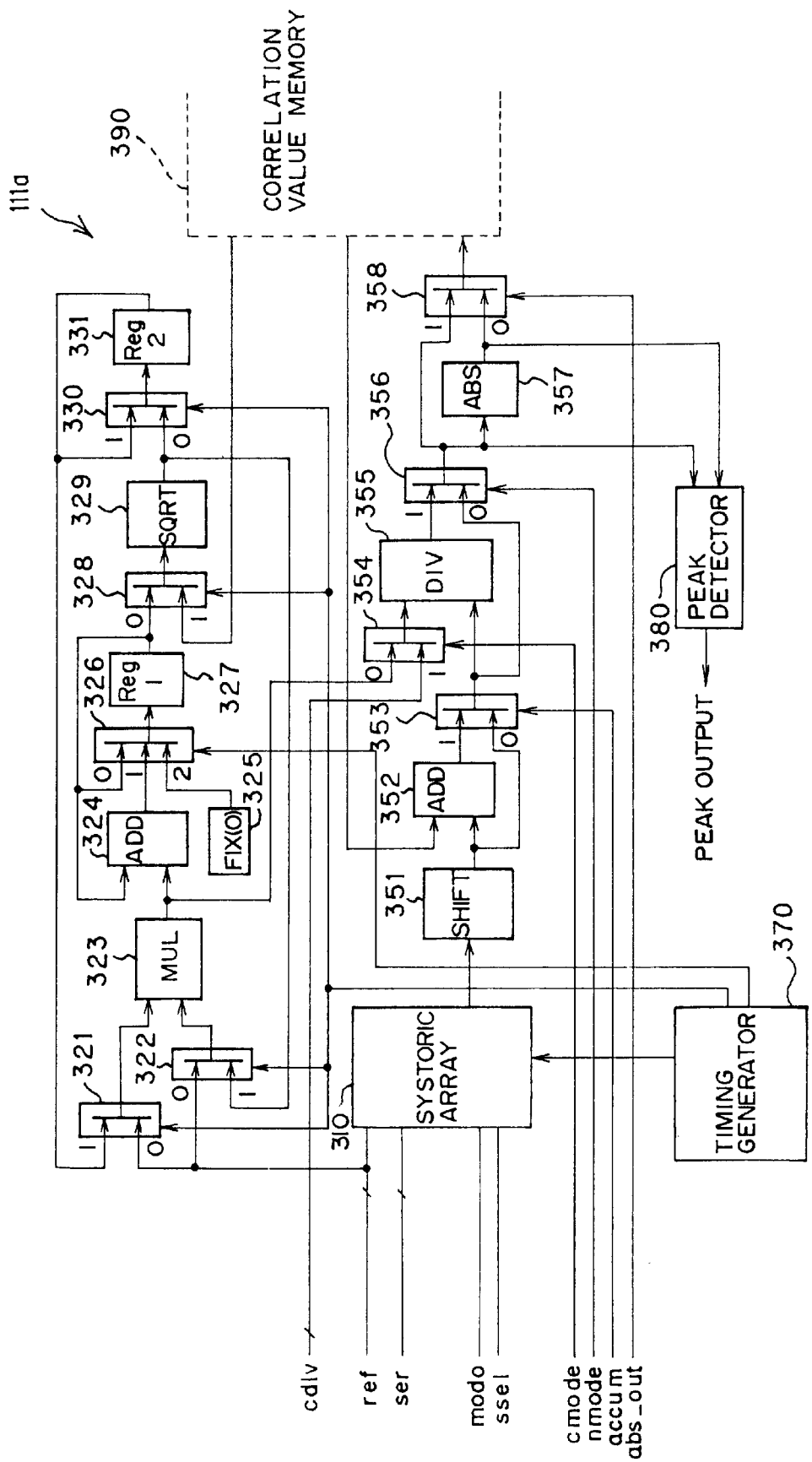
FIG. 9 is a circuit block diagram showing an internal structure of an image processing section 111a which is a part of the correlation image processing device shown in FIG. 8.

FIG. 9 is a circuit block diagram showing an internal structure of an image processing section 111a which is a part of the correlation image processing device 111 shown in FIG. 8.

Table 1 shows meaning of various marks shown in FIG. 9.

TABLE 1

| Terminal | Explanation | State |
|---|---|---|
| ref | Reference image data | — |
| ser | Search image data | — |
| mode | Operation mode | 0: SAD 1: product correlation 2: product correlation + normalization 3: spatial filter |
| sse1 | Designation of norm computation of search image | 0: normal (r-s) 1: computation of norm of search image (s-s) |
| cmode | Selection of denominator of division | 0: normalization processing 1: constant division (spatial filter) |
| nmode | On and off of division | 0: no division 1: division |
| accum | Designation of correlation value accumulation | 0: no division 1: division |
| abs_out | Designation of absolute value output correlation value | 0: absolute value output 1: output as it is |
| cdiv | Constant data (for division of filter) | — |

Hereinafter, FIG. 9 will be explained in conjunction with FIG. 10 and the subsequent figures.

Figure 10:
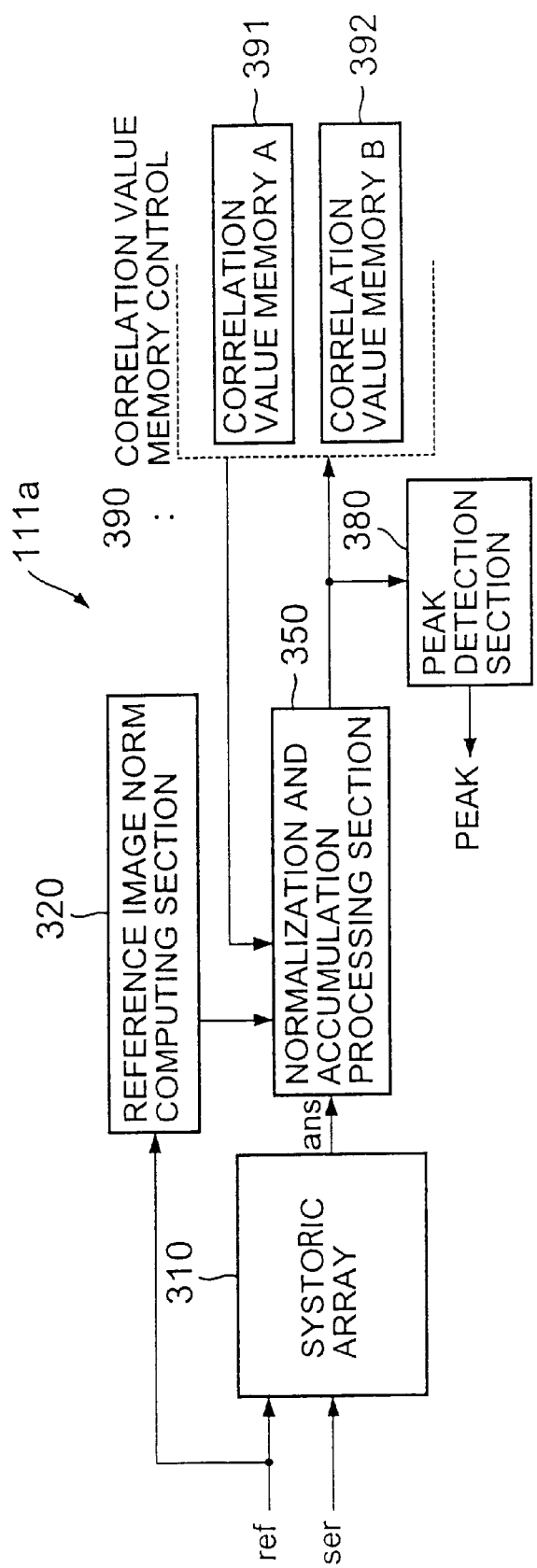
FIG. 10 is a schematic block diagram of the image processing section shown in FIG. 9.

FIG. 10 is a schematic block diagram of the image processing section 111a shown in FIG. 9.

The image processing section 111a comprises, as shown in FIG. 10, a systoric array 310, a reference image norm computing section 320, a normalization and accumulation processing section 350, a peak detection section 380 and a correlation value memory control section 390. The correlation value memory control section 390 has two correlation value memories 391 and 392 which store results on operations still in progress and the final result on operations. According to the present embodiment, there are provided only two correlation memories, and are provided an arrangement that a suitable use of those two correlation value memories 391 and 392 in different ways depending on the purpose makes it possible to cope with any arithmetic operation which will be described hereinafter. In FIG. 10, the systoric array 310, the normalization and accumulation processing section 350, and the correlation value memory control section 390 in their combination corresponds to an example of the product-sum operation referred to in the present invention.

Figure 11:
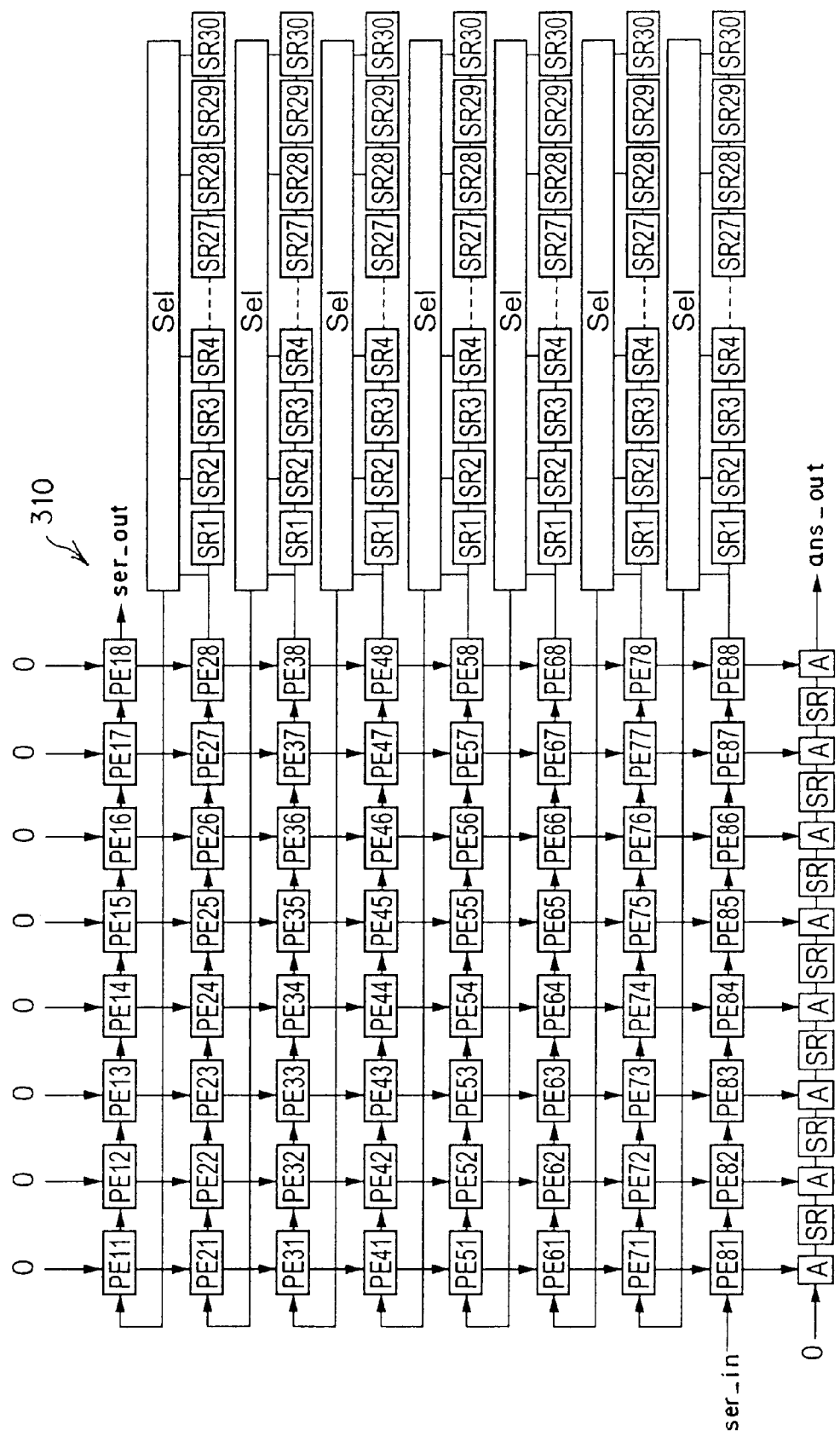
FIG. 11 is a view of an internal structure of a systoric array shown in FIGS. 9 and 10.

FIG. 11 is a view of an internal structure of a systoric array shown in FIGS. 9 and 10.

Figure 12:
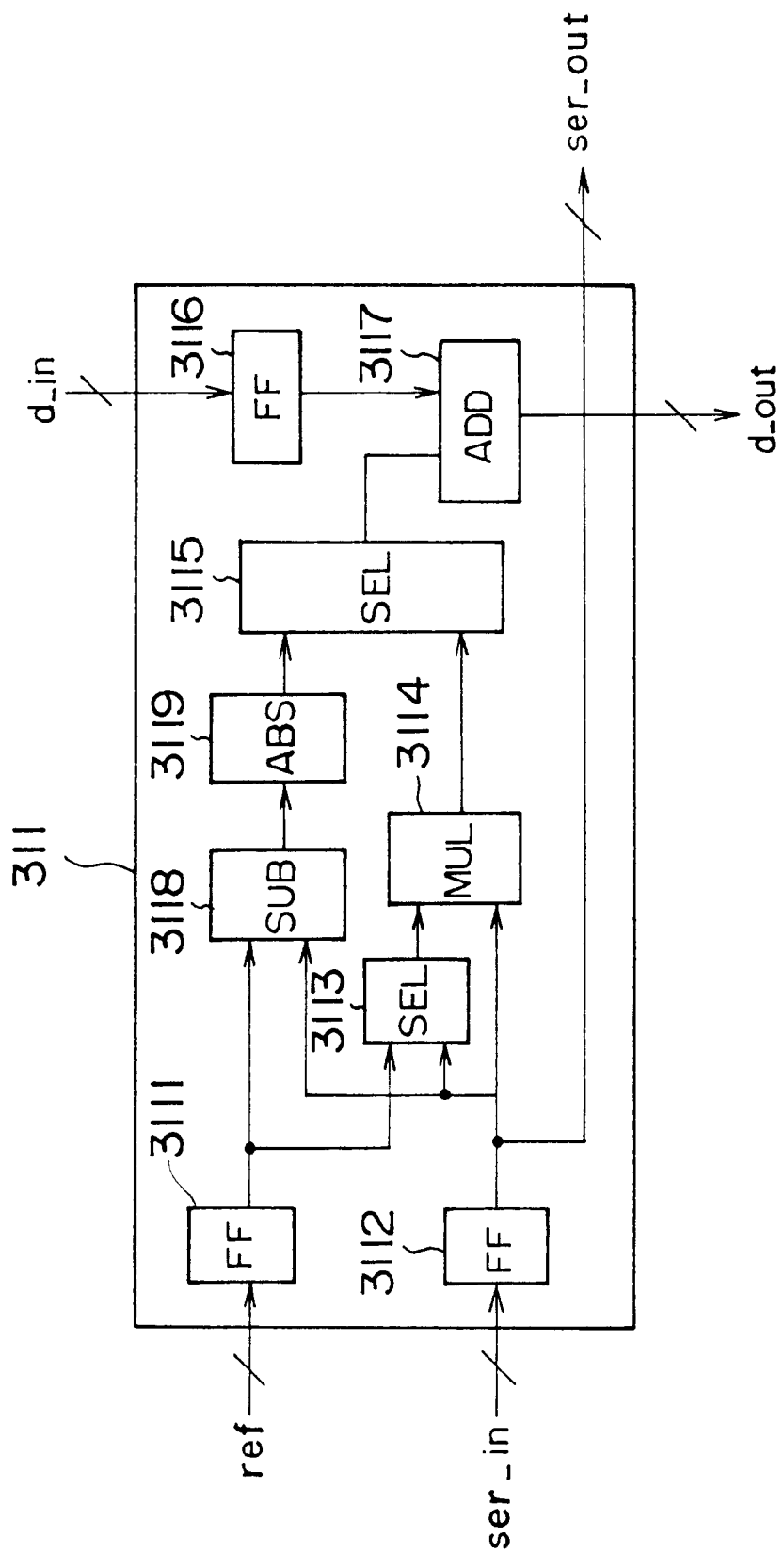
FIG. 12 is a view showing one of arithmetic elements arranged in the systoric array.

In FIG. 11, PE11, PE12, . . . , PE88 denote operation elements of an arrangement shown in FIG. 12; A an adder; SR, SR1, SR2, . . . , SR30 each a clock of delay circuit composed of shift registers; Se1 a selector for determining from which an output is to be derived among thirty pieces of delay circuits SR1, SR2, . . . , SR30.

When the systoric array 310 is used to perform a product-sum operation between the reference image ref and the search image ser, pixel value data for the reference image (8 pixels×8 pixels) are set to operation elements PE11~PE88, and data for pixels of the search image are sequentially inputted in synchronism with clocks from the lower left (ser_in) of FIG. 11 and are outputted through the systoric array 310 to the upper right (ser_out). The number of clocks for transmission of data from ser_in to ser_out is varied in accordance with an extent of the usage of the delay circuits SR1~SR30, so that a size of the search image to be subjected to the product-sum operation with respect to the reference image is determined.

A product-sum operation result ans is outputted from the right end of an arrangement in which the adders A and the delay circuits SR are alternately arranged.

FIG. 12 is a view showing one of arithmetic operation elements arranged in the systoric array shown in FIG. 11. Each of the operation elements arranged in the systoric array shown in FIG. 11 has a structure shown in FIG. 12.

The operation element has a register 3111 for storing a pixel of data of the reference image ref, and a register 3112 for storing a pixel of data of the search image ser sequentially inputted in synchronism with the clock, which is inputted to an operation element 311 in synchronism with the clock pulse. The pixel data of the search image stored in the register 3112 is outputted from the operation element 311 as it is (ser_out), and then transmitted to the subsequent operation element.

When the product-sum operation is performed between the reference image ref and the search image ser, a selector 3113 is used to select data stored in the register 3111 so that a multiplier 3114 is used to perform a multiplication of data stored in the registers 3111 and 3112. A result of the multiplication is fed via a selector 3115 to an adder 3117. On the other hand, a register 3116 receives and stores an addition result d_in from the upper stage of operation element shown in FIG. 12, and the adder 3117 adds the addition result d_in from the operation elements to the multiplication result as to the pixels of the reference image and the search image obtained through the operation elements 311, and outputs the added sum to the lower stage of operation element or the adder A located at the last stage shown in FIG. 11.

The operation elements shown in FIG. 12 are also associated with the product-sum operation between the search images ser. That is, according to those operation elements, it is also permitted to perform a square of each pixel value of the search image. At that time, the selector 3113 selects the register 3112. And the multiplier 3114 determines a square of a pixel value of a pixel of the search image.

Further, the operation elements are also associated with the above-mentioned SAD correlation operation. At that time, a subtractor 3118 determines a difference value as to the pixel values stored in the registers 3111 and 3112. And an absolute value arithmetic device 3119 determines an absolute value of the difference value. The absolute value thus determined is transmitted via the selector 3115 to the adder 3117 so as to be added to the value transmitted from the upper stage of operation element.

Next, there will be explained an operation of the systoric array. While FIG. 11 shows the systoric array in which 8×8=64 (pieces) of operation elements are arranged, here, for the purpose of simplification, there will be described a small type of systoric array in which 4×4=16 (pieces) of operation elements are arranged, FIG. 13 typically shows a reference image (A), a search image (B) and a correlation arithmetic result (C).

Figure 13:
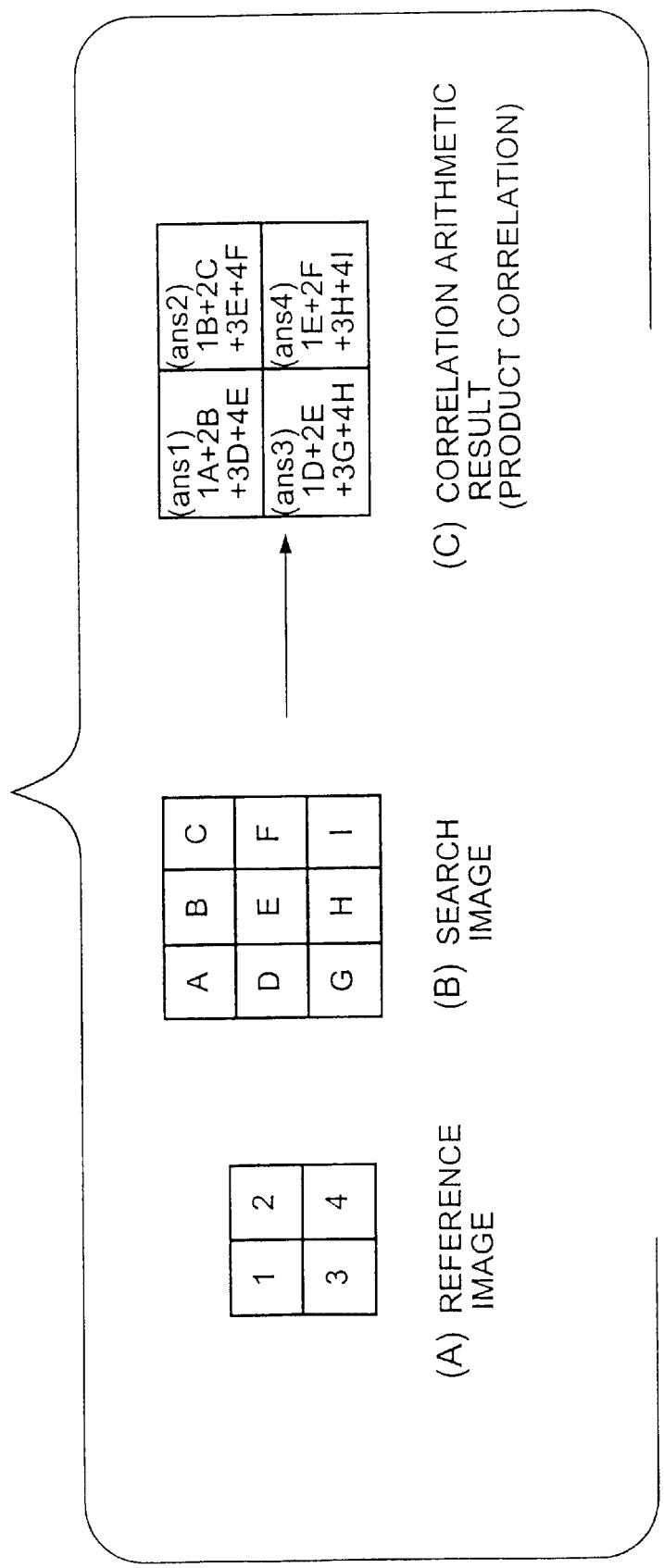
FIG. 13 typically shows a reference image (A), a search image (B) and a correlation arithmetic result (C).

Here, for the purpose of simplification, it is assumed that a reference image shown in part (A) of FIG. 13 is of a size of 2 pixels×2 pixels, and pixel values of pixels, to which the numbers of '1', '2', '3', and '4' are applied, are 1, 2, 3 and 4, respectively.

And it is assumed that a search image shown in part (B) of FIG. 13 is of a size of 3 pixels×3 pixels, and pixel values of pixels, to which the alphabetical letters of 'A', 'B', 'C', . . . , and 'I' are applied, are A, B, C, . . . , and I, respectively.

When a product correlation operation is performed between the reference image of the part (A) of FIG. 13 and the search image of the part (B) of FIG. 13, there is obtained a correlation operation result of part (C) of FIG. 13. That is, when there is provided such an arrangement that the pixels '1', '2', '3', and '4' of the reference image of the part (A) of FIG. 13 are superposed on the pixels 'A', 'B', 'D', and 'E' of the search image of the part (B) of FIG. 13, respectively, and the respective multiplication results of the superposed pixels are mutually added, then as shown in (ans1) appearing at the upper left of the correlation operation result of the part (C) of FIG. 13, there is obtained 1A+2B+3D+4E. When there is provided such an arrangement that the pixels '1', '2', '3' and '4' of the reference image of the part (A) of FIG. 13 are superposed on the pixels 'B', 'C', 'E' and 'F' of the search image of the part (B) of FIG. 13, respectively, and the respective multiplication results of the superposed pixels are mutually added, then as shown in (ans2) appearing at the upper right of the correlation operation result of the part (C) of FIG. 13, there is obtained 1B+2C+3E+4F. When there is provided such an arrangement that the pixels '1', '2', '3', and '4' of the reference image of the part (A) of FIG. 13 are superposed on the pixels 'D', 'E', 'G', and 'H' of the search image of the part (B) of FIG. 13, respectively, and the respective multiplication results of the superposed pixels are mutually added, then as shown in (ans3) appearing at the lower left of the correlation operation result of the part (C) of FIG. 13, there is obtained 1D+2E+3G+4H. When there is provided such an arrangement that the pixels '1', '2', '3', and '4' of the reference image of the part (A) of FIG. 13 are superposed on the pixels 'E', 'F', 'H', and 'I' of the search image of the part (B) of FIG. 13, respectively, and the respective multiplication results of the superposed pixels are mutually added, then as shown in (ans4) appearing at the lower right of the correlation operation result of the part (C) of FIG. 13, there is obtained 1E+2F+3H+4I.

Hereinafter, it will be shown that a systoric array having four operation elements is used to obtain the above-mentioned arithmetic operation results.

Figure 14:
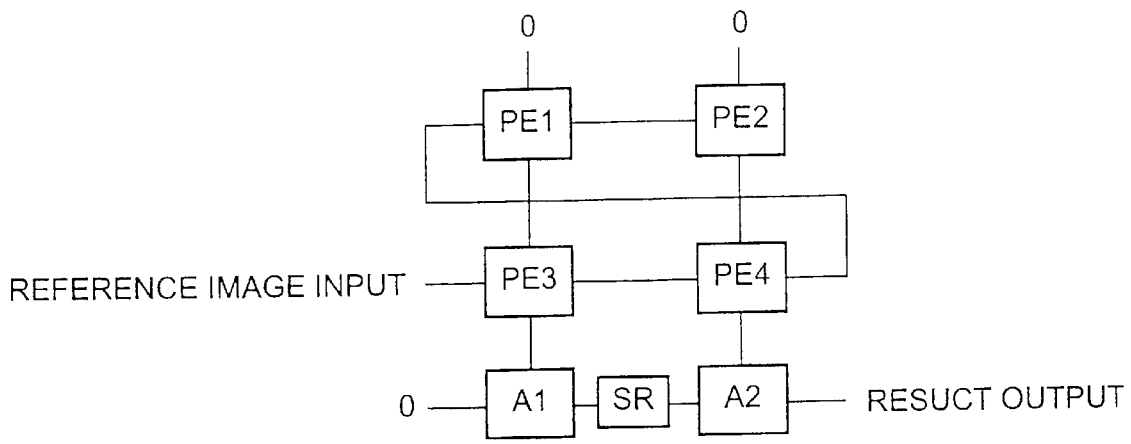
FIG. 14 is a construction view of a systoric array having four arithmetic elements.

FIG. 14 is a construction view of a systoric array having four arithmetic operation elements.

In the systoric array shown in FIG. 14, four operation elements PE1, PE2, PE3, and PE4 are arranged, and further two adders A1 and A2 and one delay circuit SR are arranged.

FIGS. 15 to 23 are views each showing an arithmetic operation result or storage data on each of elements of the systoric array in accordance with the lapse of time.

Figure 15:
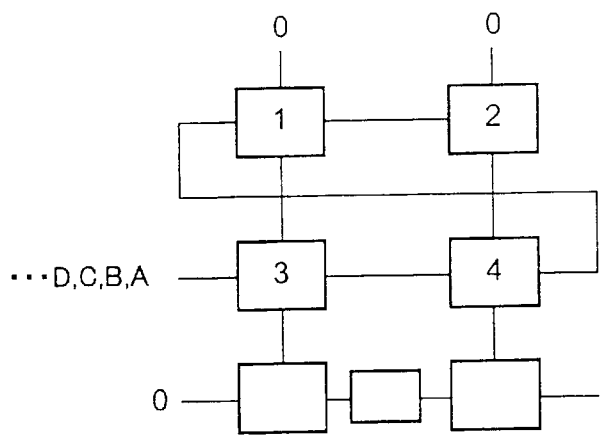
FIG. 15 is a view showing an arithmetic result or storage data on each of elements of the systoric array in accordance with the lapse of time.

First, the pixel values 1, 2, 3 and 4 of the pixels '1', '2', '3', and '4' of the reference image of the part (A) of FIG. 13 are set, as shown in FIG. 15, to the register 3111 shown in FIG. 12, of the associated one of the operation elements PE1, PE2, PE3, and PE4, so that the pixel values A, B, C, . . . , and I of the pixels 'A', 'B', 'C', . . . , and 'I' of the search image of the part (B) of FIG. 13 are inputted in the named order in synchronism with the clock in sequence of PE3→PE4→PE1→PE2.

FIG. 15 shows a state that the pixel values 1, 2, 3 and 4 of the pixels of the reference image are set to each operation element and the search image is just now intended to be inputted.

Figure 16:
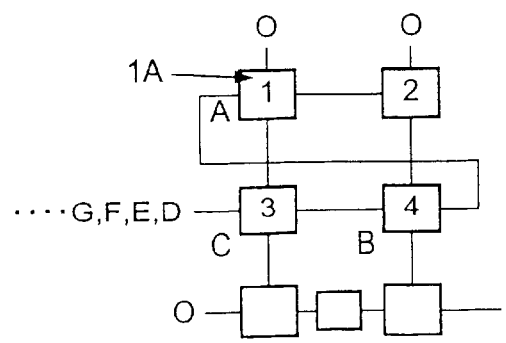
FIG. 16 is a view showing an arithmetic result or storage data on each of elements of the systoric array in accordance with the lapse of time.

FIG. 16 shows a state advanced by three clocks from the state of FIG. 15, in which the pixel values A, C and B of the pixels 'A', 'C', and 'B' of the search image are inputted to the operation elements PE1, PE3 and PE4. At that time, in the operation element PE1, 1×A=1A is determined.

Figure 17:
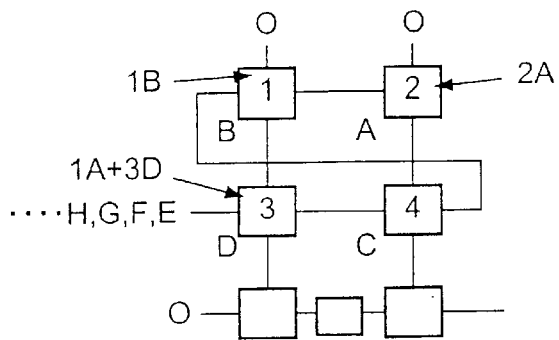
FIG. 17 is a view showing an arithmetic result or storage data on each of elements of the systoric array in accordance with the lapse of time.

FIG. 17 shows a state advanced by one clock from the state of FIG. 16, in which B, A, D and C are inputted to the operation elements PE1, PE2, PE3 and PE4, respectively. In the operation elements PE1 and PE2, 1B and 2A are determined, respectively, and in the operation element PE3, 3D is determined and the thus determined 3D is added to 1A determined in the operation element PE1 in the previous state (the state of FIG. 16) before one clock, so that 1A+3D is determined.

Figure 18:
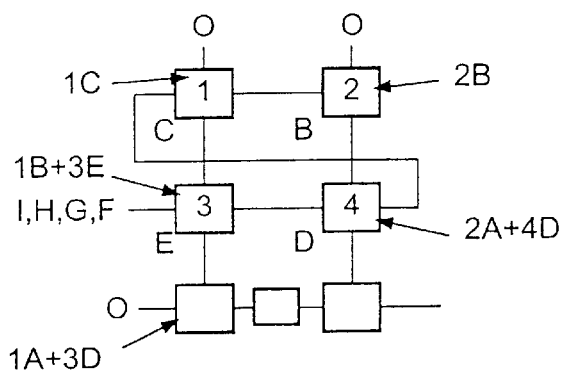
FIG. 18 is a view showing an arithmetic result or storage data on each of elements of the systoric array in accordance with the lapse of time.

FIG. 18 shows a state advanced by one clock from the state of FIG. 17, in which C, B, E and D are inputted to the operation elements PE1, PE2, PE3 and PE4, respectively. In the operation elements PE1 and PE2, 1C and 2B are determined, respectively, and in the operation elements PE3 and PE4, 1B+3E and 2A+4D are determined, respectively and 1A+3D, which is determined before one clock in the operation element PE3, is added to the adder A1.

Figure 19:
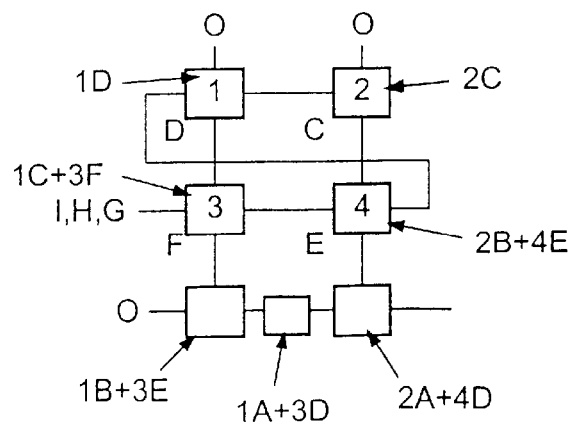
FIG. 19 is a view showing an arithmetic result or storage data on each of elements of the systoric array in accordance with the lapse of time.

FIG. 19 shows a state advanced by one clock from the state of FIG. 18, in which D, C, F and E are inputted to the operation elements PE1, PE2, PE3 and PE4, respectively. In the operation elements PE1 and PE2, 1D and 2C are determined, respectively, and in the operation elements PE3 and PE4, 1C+3F and 2B+4E are determined, respectively, 1 B+3 E, which is determined before one clock in the operation element PE3, is fed to the adder A1, 1A+3D, which is stored in the adder A1 before one clock, is fed to the delay circuit SR, and 2A+4D, which is determined before one clock in the operation element PE4, is stored in the adder A2.

Figure 20:
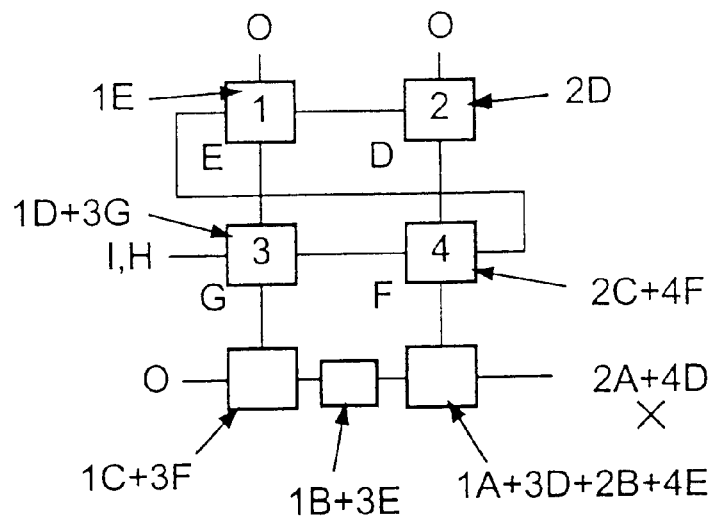
FIG. 20 is a view showing an arithmetic result or storage data on each of elements of the systoric array in accordance with the lapse of time.

FIG. 20 shows a state advanced by one clock from the state of FIG. 19, in which E, D, G and F are stored in the operation elements PE1, PE2, PE3 and PE4, respectively. In the operation elements PE1 and PE2, 1E and 2D are determined, respectively, and in the operation elements PE3 and PE4, 1D+3G and 2C+4F are determined, respectively, 1C+3F, which is determined before one clock in the operation element PE3, is fed to the adder A1, 1B+3E, which is fed to the adder A1 before one clock, is fed to the delay circuit SR, and the adder A2 receives and adds both 1A+3D, which is fed to the delay circuit SR before one clock, and 2B+4E, which is determined in the operation element PE4, together, so that 1A+3D+2B+4E is determined. While 2A+4D, which is fed to the adder A2 before one clock, is outputted from the adder A2, 2A+4D is an unnecessary value and thus it is neglected.

Figure 21:
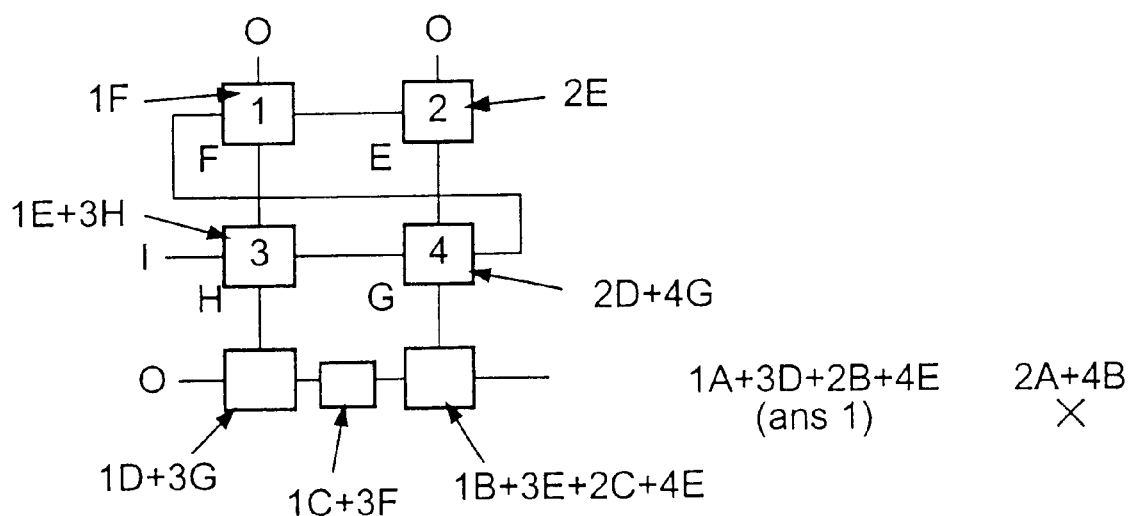
FIG. 21 is a view showing an arithmetic result or storage data on each of elements of the systoric array in accordance with the lapse of time.

FIG. 21 shows a state advanced by one clock from the state of FIG. 20, in which E, F, H and G are inputted to the operation elements PE1, PE2, PE3 and PE4, respectively. In the operation elements PE1 and PE2, 1F and 2E are determined, respectively, and in the operation elements PE3 and PE4, 1E+3H and 2D+4G are determined, respectively, 1D+3G is fed to the adder A1, 1C+3F is fed to the delay circuit SR, and the adder A2 determines 1B+3E+2C+4F and outputs 1A+3D+2B+4E. 1A+3D+2B+4E, which is outputted from the adder A2, is the same as the arithmetic operation result (ans1) appearing at the upper left of the part (C) of FIG. 13.

Figure 22:
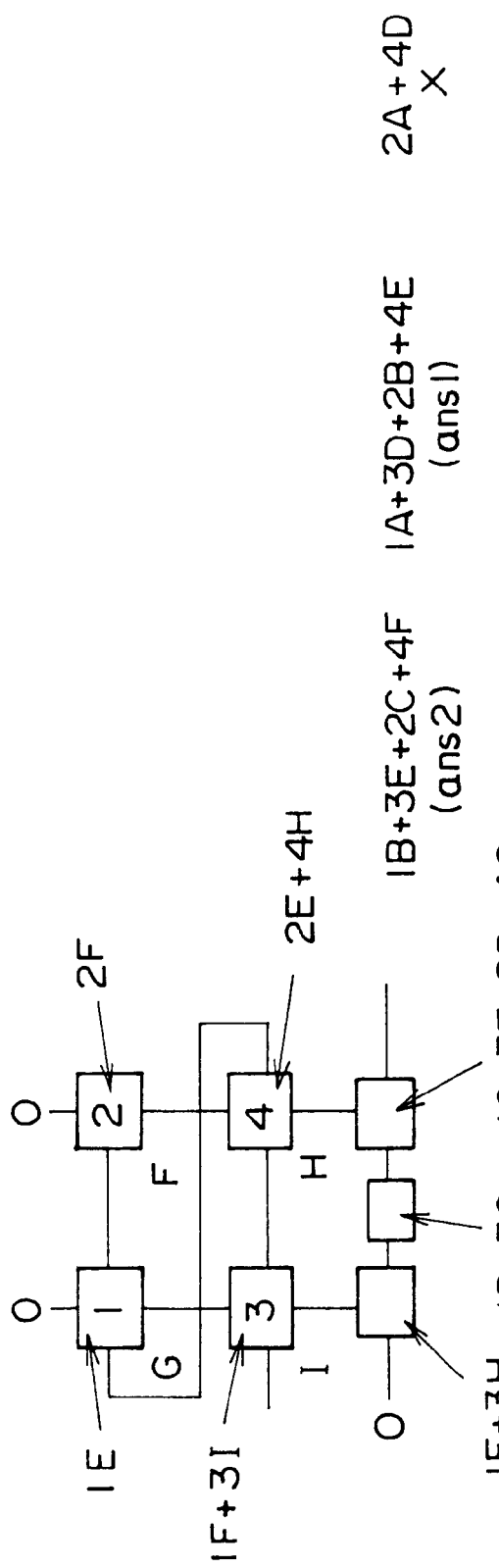
FIG. 22 is a view showing an arithmetic result or storage data on each of elements of the systoric array in accordance with the lapse of time.

FIG. 22 shows a state advanced by one clock from the state of FIG. 21, in which G, F, I and H are inputted to the operation elements PE1, PE2, PE3 and PE4, respectively. In the operation elements PE1 and PE2, 1E and 2F are determined, respectively, and in the operation elements PE3 and PE4, 1F+3I and 2E+4H are determined, respectively, 1E+3H is fed to the adder A1, 1D+3G is fed to the delay circuit SR, and the adder A2 determines 1C+3F+2D+4G and outputs 1B+3E+2C+4F. 1B+3E+2C+4F, which is outputted from the adder A2, is the same as the arithmetic operation result (ans2) appearing at the upper right of the part (C) of FIG. 13.

Figure 23:
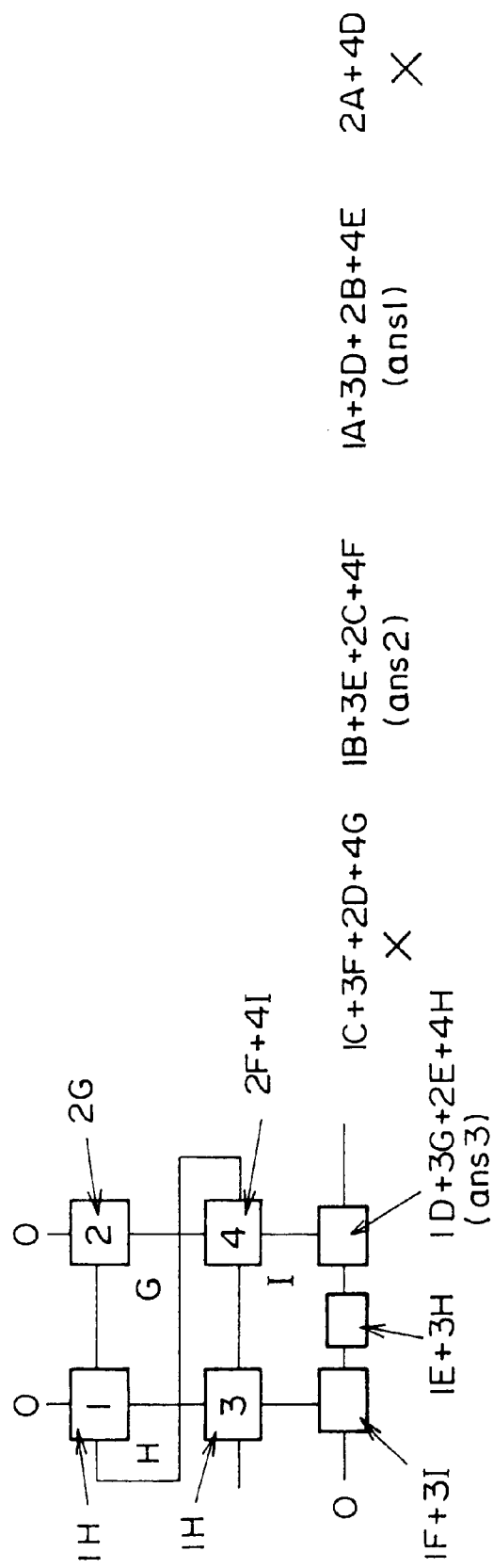
FIG. 23 is a view showing an arithmetic result or storage data on each of elements of the systoric array in accordance with the lapse of time.

FIG. 23 shows a state advanced by one clock from the state of FIG. 22, in which H, G and I are inputted to the operation elements PE1, PE2 and PE4, respectively, and the operation element PE3 is empty. In the operation elements PE1 and PE2, 1H and 2G are determined, respectively, and in the operation element PE4, 2F+4I is determined, 1F+3I is fed to the adder A1, 1E+3H is fed to the delay circuit SR, and the adder A2 determines 1D+3G+2E+4H, and outputs 1C+3F+2D+4G. 1C+3F+2D+4G, which is outputted from the adder A2, is an unnecessary value and thus it is neglected. 1D+3G+2E+4H, which is determined in the adder A2, is the same as the arithmetic operation result (ans3) appearing at the lower left of the part (C) of FIG. 13.

Further prosecution of the above-mentioned operation makes it possible to determine the arithmetic operation result (ans4) appearing at the lower right of the part (C) of FIG. 13.

In this manner, according to the systoric array, there are determined not only the arithmetic operation result to be determined, but also the unnecessary value, but generating timing of the arithmetic operation result to be determined and generating timing of the unnecessary value are known beforehand, and thus it is possible to detect the arithmetic operation result of interest.

The explanation for the systoric array is terminated here, and next there will be explained the reference image norm computing section 320 shown in FIG. 10.

Figure 24:
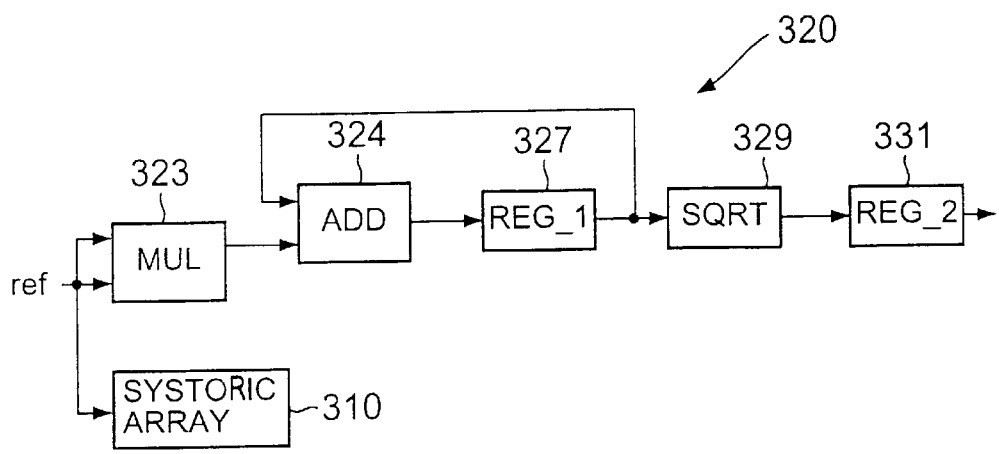
FIG. 24 is a schematic block diagram of a reference image norm computing section.

FIG. 24 is a schematic block diagram of a reference image norm computing section 320.

The reference image ref fed for each pixel is separated into two lines and fed via the selectors 321 and 322 shown in FIG. 9 to the multiplier 323. The multiplier 323 simultaneously receives pixel values of the same pixel of the reference image separated into two lines so as to be subjected to the multiplication. That is, the multiplier 323 determines a square of the pixel value. The square value of the pixel value determined in the multiplier 323 is fed to fed to an adder 324, so that it is added to the value stored in a register 327.

An additional value by the adder 324 is stored via the selector 326 shown in FIG. 9 in the register 327. The register 327 stores therein via the selector 326, prior to the initiation of the operation, the value 0 from a fixed value generating circuit 325 for generating a fixed value (here, 0) shown in FIG. 9. Accordingly, pixel values of the respective pixels of the reference image are sequentially fed so that the multiplier 323 determines the square value of the entered pixel values, and the adder 324 adds the square value thus determined and the value stored in the register 327 and the additional result is stored in the register 327. Repetition of this sequence makes it possible to finally store in the register 327 the additional value of the square values of the pixel values of the respective pixels of the reference image throughout the reference image. When the register 327 stores therein the additional value throughout the reference image, the additional value stored in the register 327 is fed via the selector 328 shown in FIG. 9 to a square root computing device 329 to determine a square root of the additional value. The square root thus determined is, that is, the norm of the reference image. The norm of the reference image is stored via the selector 330 in a register 331.

In this manner, the reference image norm computing section 320 computes the norm of the reference image and stores therein the same in the register 331.

FIGS. 25 to 28 are block diagrams each useful for understanding a flow of processing of portions taking the normalization and accumulation processing section 350 of the image processing section 111a shown in FIG. 10.

Figure 25:
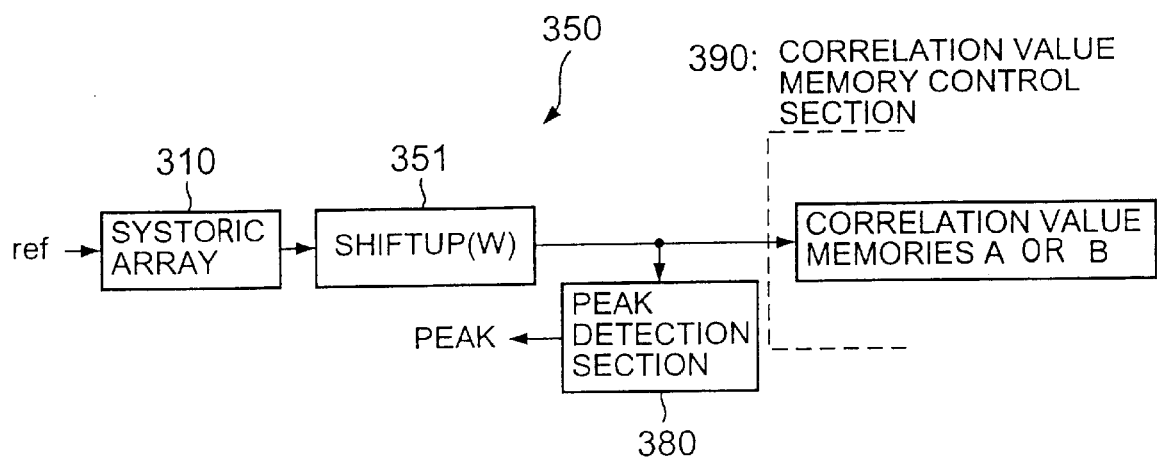
FIG. 25 is a block diagram useful for understanding a flow of processing of portions taking the normalization and accumulation processing section of the image processing section.

FIG. 25 is a block diagram useful for understanding a flow of processing in which an accumulation processing is not performed. Incidentally, the accumulation processing will be described later.

The search image ser is fed to a systoric array 310 so that the product-sum operation (in some case, it happens that the additional value for the absolute of the difference value is determined for the SAD correlation operation), which is described referring to FIGS. 13 to 23, is performed. While the description of FIGS. 13 to 23 is concerned with the product-sum operation of the reference image and the search image, here first, there will be described a case where an additional value of the square values of the pixel values of the respective pixels of the search image is determined.

The search image ser is directly fed to the multiplier 3114 of the operation element 311 shown in FIG. 12, and the search image ser is selected by the selector 3113. Thus, the search image ser is also fed via the selector 3113 to the multiplier 3114 to determine the square value of the pixel values of the search image. That is, the systoric array 310 determines the additional value of square values of the pixel values of the search image throughout a plurality of pixels. The additional value thus determined passes through a shift up circuit 351 shown in FIG. 25 and is stored via the selectors 353, 356 and 358 shown in FIG. 9 in one of two correlation value memories provided on the correlation value memory control section 390.

According to the present embodiment, while the pixel value of each pixel is expressed by 8 bits, the multiplier 3114 of each operation element of the systoric array shown in FIG. 11 does not have an ability of performing the multiplication of 8 bits and 8 bits, and indeed, the multiplier 3114 performs the multiplication of 8 bits and 2 bits.

For this reason, in the systoric array 310, first, the product-sum operation (a partial operation of the product-sum operation for pixel values) is performed between the pixel value (8 bits) of the search image and the lower significant 2 bits of the same pixel value, and the operational result is stored in the correlation value memory.

Figure 26:
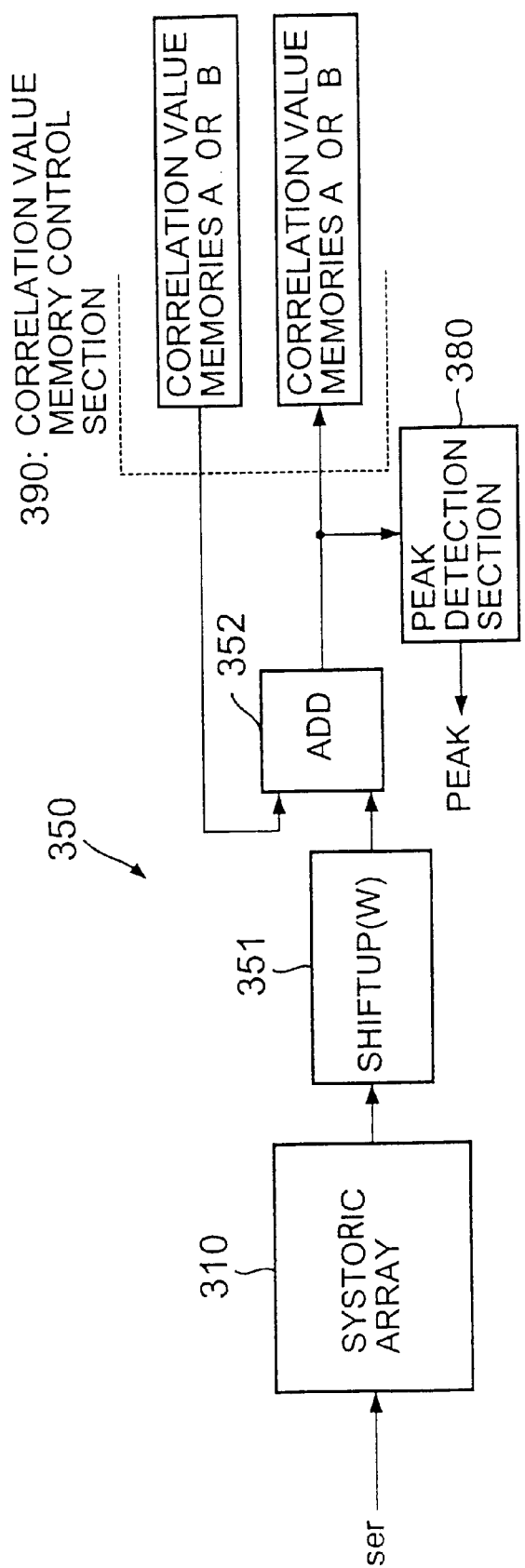
FIG. 26 is a block diagram useful for understanding a flow of processing of portions taking the normalization and accumulation processing section of the image processing section.

FIG. 26 is a block diagram useful for understanding a flow of a processing in the normalization and accumulation processing section 350 when the partial operation for the second time or more is performed.

In the partial operation for the second time, the systoric array 310 performs a product-sum operation between the pixel value (8 bits) of the search image and the subsequent lower significant 2 bits of the least significant 2 bits of the same pixel value. The shift up circuit 351 shifts by 2 bits the contents to the upper significant side. The adder circuit 352 adds the partial operation result obtained through 2 bit-shift to the upper significant side in the shift up circuit 351 and the partial operation result between the pixel value (8 bits) of the search image and the subsequent lower significant 2 bits of the least significant 2 bits of the same pixel value, the later partial operation result being computed last. The additional value is stored in the correlation value memory again.

In the partial operation for the third time, the systoric array 310 performs a product-sum operation between the pixel value (8 bits) of the search image and the subsequent lower significant 2 bits of the least significant 4 bits of the same pixel value. The shift up circuit 351 shifts by 4 bits the contents to the upper significant side. The adder circuit 352 adds the partial operation result obtained through 4 bit-shift to the upper significant side and the value stored in the correlation value memory last (the partial operation for the second time). The additional value is also stored in the correlation value memory again.

The above-mentioned processing is repeated. In the partial operation for the final (four time), the systoric array 310 performs a product-sum operation between the pixel value (8 bits) of the search image and the upper significant 2 bits of the same pixel value. The shift up circuit 351 shifts by 6 bits the contents to the upper significant side. The adder circuit 352 adds the partial operation result obtained through 6 bit-shift to the upper significant side and the value stored in the correlation value memory last. The additional value in the final partial operation is an additional value over the search image of the square value of the pixel value of the search image. The additional value is stored in the correlation value memory again.

Thus, when there is provided a circuit arrangement that an arithmetic operation is performed in such a manner that the operation is divided into partial operations for a plurality of number of times, it is possible to reduce a circuit scale, make the delay of a multiplier smaller and raise the operation clock of the systoric array.

Next, the systoric array 310 and the normalization and accumulation processing section 350 perform the product-sum operation between the reference image and the search image. This is the same as the above-mentioned matter except for the fact that the selector 3113 of the operation element 311 shown in FIG. 12 of the systoric array 310 is used to select the reference image ref stored in the register 3111. That is, in the partial operation for the first time, the product-sum operation is performed between the reference image (8 bits) and the lower significant 2 bits of the search image, in the partial operation for the second time, the product-sum operation is performed between the reference image (8 bits) and the subsequent lower significant 2 bits of the least significant 2 bits of the search image, and the contents are shifted to the upper significant side so that the adder circuit 352 adds the partial operation result obtained through 2 bit-shift to the upper significant side in the shift up circuit 351 and the partial operation result for the first time, thereafter, the above-mentioned processing is repeated, and in the final partial operation, the product-sum operation between the reference image and the search image is completed, so that the value corresponding to the numerator of the above-mentioned formula (1) is determined.

In the final operation, following the product-sum operation between the reference image and the search image, further operation is performed. This further operation will be explained referring to FIG. 27.

The product-sum operation result between the reference image and the search image, which is obtained by the adder 352, is fed via the selectors 353 shown in FIG. 9 to a divider 355. The additional value of the square value of the pixel value of the search image stored in the correlation memory is read from the correlation memory and fed via the selector 328 shown in FIG. 9 to the square root computing device 329 so as to determine the square root or a norm of the search image. The norm of the search image, which is determined by the square root computing device 329, is fed via the selector 322 to the multiplier 323. The multiplier 323 receives the norm of the reference image, which is stored in the register 331 (cf. FIG. 9 together), via the selector 321. The multiplier 323 multiplies the norm of the inputted search image and the norm of the reference image together so as to determine the value corresponding to the denominator of the above-mentioned formula (1). The multiplication result by the multiplier 323 is fed via the selector 354 shown in FIG. 9 to the divider 355 so that the division corresponding to the formula (1) is performed to determine a normalization correlation value.

The normalization correlation value thus determined is stored in the correlation value memory and is fed to the peak detection section 380. The peak detection section 380 determines a peak position of the normalization correlation value so that a vector to the peak position thus determined is transferred to the CPU 114 shown in FIG. 8 in form of a movement vector of a moving object appearing on the search image.

Storage of the normalization correlation value thus determined in the correlation value memory makes it possible to perform not only a detection of the peak position but also a detailed analysis.

Next, there will be described another embodiment of arithmetic operations which can be executed by the image processing section 111a shown in FIG. 9.

Figure 28:
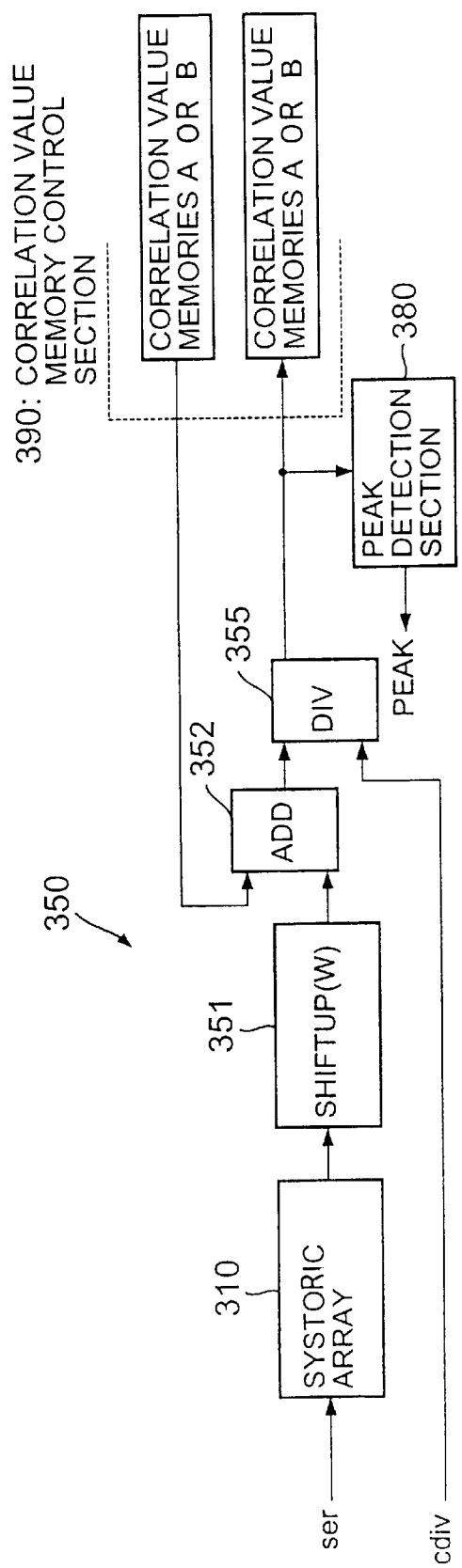
FIG. 28 is a block diagram useful for understanding a flow of processing of portions taking the normalization and accumulation processing section of the image processing section.

FIG. 28 is a block diagram useful for understanding a processing of the normalization and accumulation processing section 350 (cf. FIG. 10) when a spatial filtering processing is carried out for an image.

When a space filter operator is used as the reference image, the use of the correlation image processing device 111 makes it possible to carry out the spatial filtering processing for an image.

When the spatial filtering processing is carried out, there is no need to perform a computation of the norm of the reference image and the norm of the search image, but in some case, it happens that there is a need to perform a division with a constant. For this reason, according to the present embodiment, there is provided such an arrangement that CPU 114 (cf. FIG. 8) can give the constant value cdiv. The constant value cdiv is fed via the selector 354 shown in FIG. 9 to the divider 355 so that the division by the constant value cdiv is performed.

Further, there exists a spatial filter such as Sobel filter in which there is a need to determine the absolute value. For this reason, according to the present embodiment, there is provided an absolute value arithmetic device 357 (cf. FIG. 9).

Further, in the image processing section 111a, as mentioned above, it is possible to perform the SAD correlation operation as shown in the above-mentioned formula (2). The subtractor 3118, the absolute value arithmetic device 3119 and the adder 3117, which are included in the operation element 311 shown in FIG. 12 of the systoric array 310, are able to determine a difference value, an absolute value and an additional value, of values between 8 bits, respectively. Accordingly, when the SAD correlation operation is performed, it is possible to determine the SAD correlation value through an arithmetic operation once, without performing the repetitive partial operation as explained referring to FIG. 26.

According to the systoric array provided on the image processing section 111a shown in FIG. 9, as shown in FIG. 11, there are arranged operation elements of 8 pieces×8 pieces=64 pieces. Consequently, as the reference image, there is adopted, as a basic size, a size of 8 pixels×8 pixels=64 pixels. On the other hand, as the reference image, it is acceptable to use a size of 16 pixels×16 pixels=256 pixels for example. At that time, the reference image norm computing section 320 determines the additional value of the square value of the pixel value on 256 pixels and computes the square root to determine the norm of the reference image. The systoric array 310 and the normalization and accumulation processing section 350 repeat the operation, in which the respective partial area wherein the reference image is divided into partial areas of 8 pixels×8 pixels=64 pixels is given as a reference image in the above-mentioned operation, while the partial area is altered, so that a correlation operation is performed between the reference image of 16 pixels×16 pixels=256 pixels and the search image. Incidentally, when a size of the reference image of 16 pixels×16 pixels=256 pixels is adopted, there is a need to perform an operation for each partial area, with respect to the SAD correlation too. Consequently, there is a need to repeatedly perform the operation by four times. In a similar fashion to that, it is possible to perform an operation on an area of 8m pixels×8n pixels (m, n are an arbitrary positive integer).

Here, there will be described the table 1.

"ref" and "ser" denote the reference image data and the search reference data, respectively. Those are explained in the above, and thus the detailed explanation will be omitted.

"mode" denotes an operation command for designating a mode of an operation. When the mode is '0', it is instructed that the SAD correlation is performed, when the mode is '1', it is instructed that the product correlation is performed, when the mode is '2', it is instructed that the product correlation is performed and in addition the normalization (the division of the formula (1)) is performed, when the mode is '3', it is instructed that the spatial filtering processing is carried out to the image.

For example, in the event that the reference image of 16 pixels×16 pixels=256 pixels is adopted, in the operation using the partial reference image of 8 pixels×8 pixels=64 pixels for the first to third times, the operation for the product correlation is performed, but at that time, the normalization is not carried out, and at the time point that the operation for the fourth time is completed, the normalization is carried out. Accordingly, mode='1' is indicated for the operation for the first to third times, and mode '2' is indicated for the operation for the fourth time.

"sse1" denotes an operation command for performing a designation of the norm operation of the search image. sse1='0' indicates a normal mode (an arithmetic operation between the reference image ref and the search image ser). sse1='1' indicates an arithmetic operation for the norm operation of the search image, or an arithmetic operation for determining the additional value of the square value of the pixel value of the search image.

"cmode" denotes a denominator selection of a division in the divider 355. cmode='0' indicates the normalization processing (a processing for performing a division wherein a multiplication value between the norm of the reference image and the norm of the search image as shown in the formula (1) is given as the denominator). cmode='1' indicates the processing for performing a division wherein the constant value "cdiv" is given as the denominator, as explained referring to FIG. 28.

"nmode" denotes an operation command for indicating whether a division is performed by the divider 355, or the division is bypassed. This command "nmode" controls the selector 356 shown in FIG. 9. nmode='0' denotes no division, and nmode='1' denotes that the division is performed.

"accum" denotes the designation of the correlation value accumulation.

As mentioned above, the systoric array 310 can perform the multiplication only between the pixel value (8 bits) and part (2 bits) of the pixel value. Consequently, in order to complete the operation including the multiplication, there is a need to repeat the partial operation a plurality of number of times and perform an accumulation. "accum" is an operation command for designating whether the accumulation is performed. nmode='0' denotes "no accumulation". In the operation for the SAD correlation using the reference image of 8 pixels×8 pixels=64 pixels, and the partial operation for the first time of the partial operations including the multiplication between 8 bits and 2 bits, accum='0' is designated. On the other hand, in the partial operations for the second or more times including the partial operations including the multiplication, accum='1' is designated.

"abs_out" is an operation command for determining whether an absolute value operation is performed by the absolute value arithmetic device 357 shown in FIG. 9, or the absolute value arithmetic device 357 is bypassed. This command "abs_out" controls the selector 358 shown in FIG. 9. abs_out='0' denotes that the output of the absolute value arithmetic device 357 is selected, and abs_out=1 denotes that the path bypassing the absolute value arithmetic device 357 is selected.

"cdiV" denotes the constant value data and is used as the denominator of the division in the divider 355 shown in FIG. 9.

Other than the data and the operation commands shown in table 1, there exist operation commands fed to the timing generator 370 shown in FIG. 9. The timing generator 370 controls a change-over of a plurality of selectors in timing according to the entered operation command.

Figure 29:
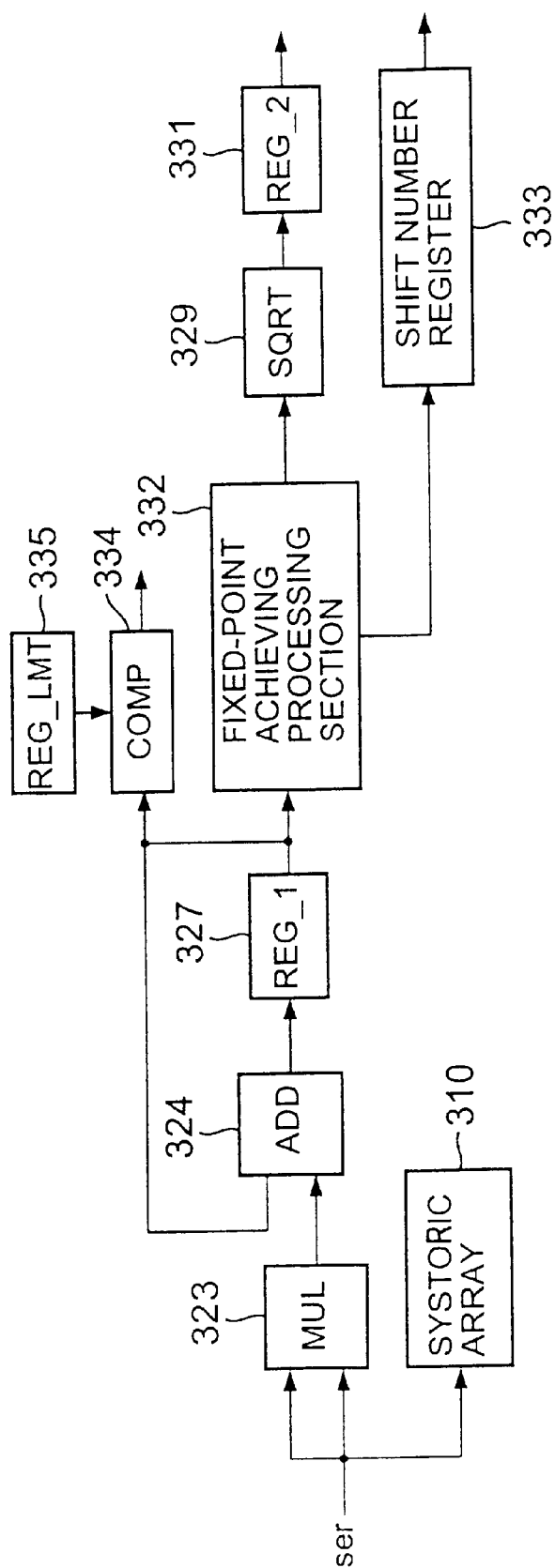
FIG. 29 is a block diagram of a reference image norm computing section which can be adopted instead of the reference image norm computing section shown in FIG. 24.
Figure 30:
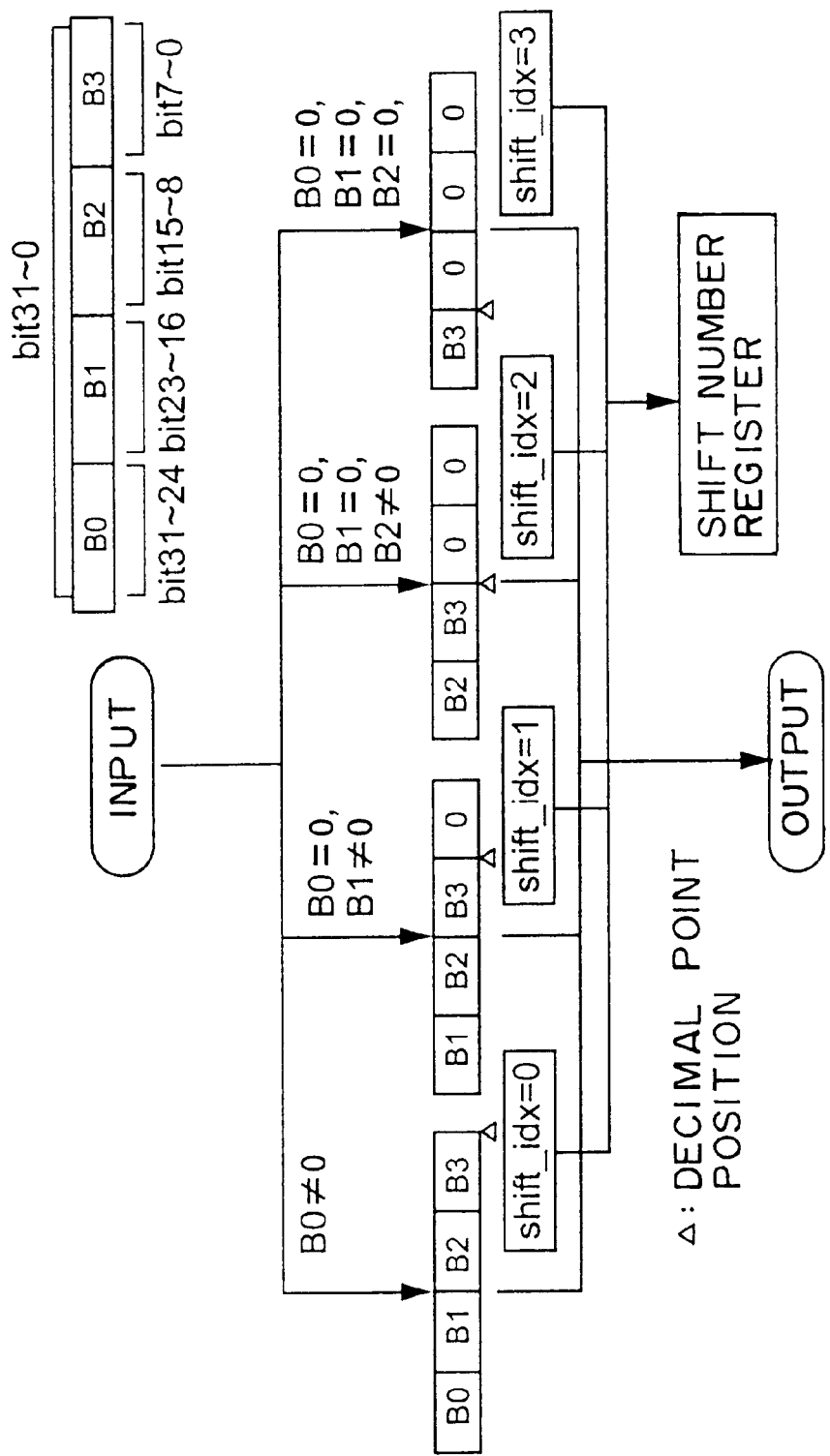
FIG. 30 is a functional explanatory view useful for understanding a first fixed-point achieving processing section.

FIG. 29 is a block diagram of a reference image norm computing section which can be adopted instead of the reference image norm computing section 320 shown in FIG. 24. FIG. 30 is a functional explanatory view useful for understanding a first fixed-point achieving processing section 332.

A difference of the reference image norm computing section shown in FIG. 29 from the reference image norm computing section 320 shown in FIG. 24 resides in the point that the reference image norm computing section shown in FIG. 29 is provided with the first fixed-point achieving processing section 332, a shift number register 333, a comparator 334 and a register 335.

The first fixed-point achieving processing section 332 performs the processing shown in FIG. 30. That is, according to the present embodiment, the bit width of the data is 32 bits (0 bit to 31 bits). In the event that 32 bits is divided into four blocks by 8 bits, when the value B0 of the block (31 to $24^{th}$ bits) of the most significant bits is given by B0≠0, no data shift is carried out while the decimal point is maintained in position at the end of $0^{th}$ bit, and the shift number register 333 stores therein shift_idx=0 which denotes no data shift.

When the value B0 of the block of the most significant bits is given by B0=0, and the value B1 of the subsequent block is given by B0≠1, then data is shifted by 8 bits to the upper significant end, so that the position of the decimal point is shifted by 8 bits. The shift number register 333 stores therein shift_idx=1 which denotes that the position of the decimal point is shifted by 8 bits.

In a similar fashion to that of the above, when there is provided B0=0, B1=0, and B2=0, data is shifted by 16 bits to the upper significant end. The shift number register 333 stores therein shift_idx=2 which denotes that the position of the decimal point is shifted by 16 bits. When there is provided B0=B1=B2=0, data is shifted by 24 bits to the upper significant end. The shift number register 333 stores therein shift_idx=3 which denotes that the position of the decimal point is shifted by 24 bits.

The above-mentioned data shift is for performing with a greater accuracy a division in the divider 355 (cf. FIG. 9) even if data is of a small value. However, when it is decided that the value of the data is too small to perform a division with necessary accuracy, the alarm is issued. That is, the register 335 shown in FIG. 29 stores a threshold value indicating that it is difficult to perform a division with a necessary accuracy if the value of data offers a predetermined value or less. The comparator 334 compares the additional value of square value of the reference image stored in the register 327 with the threshold value stored in the register 335. When the value of the register 327 is not more than the threshold value, the alarm is issued. To issue the alarm, an alarm flag is established on a status register (not illustrated), and the content of the status register is transmitted to the CPU 114 shown in FIG. 8 so that the alarm is recognized by the CPU 114. Handling of the alarm is left to a program operative in accordance with the CPU 114. The reference image norm computing section continues a computing of the norm of the reference image regardless of the fact that such an alarm is issued or not.

Figure 27:
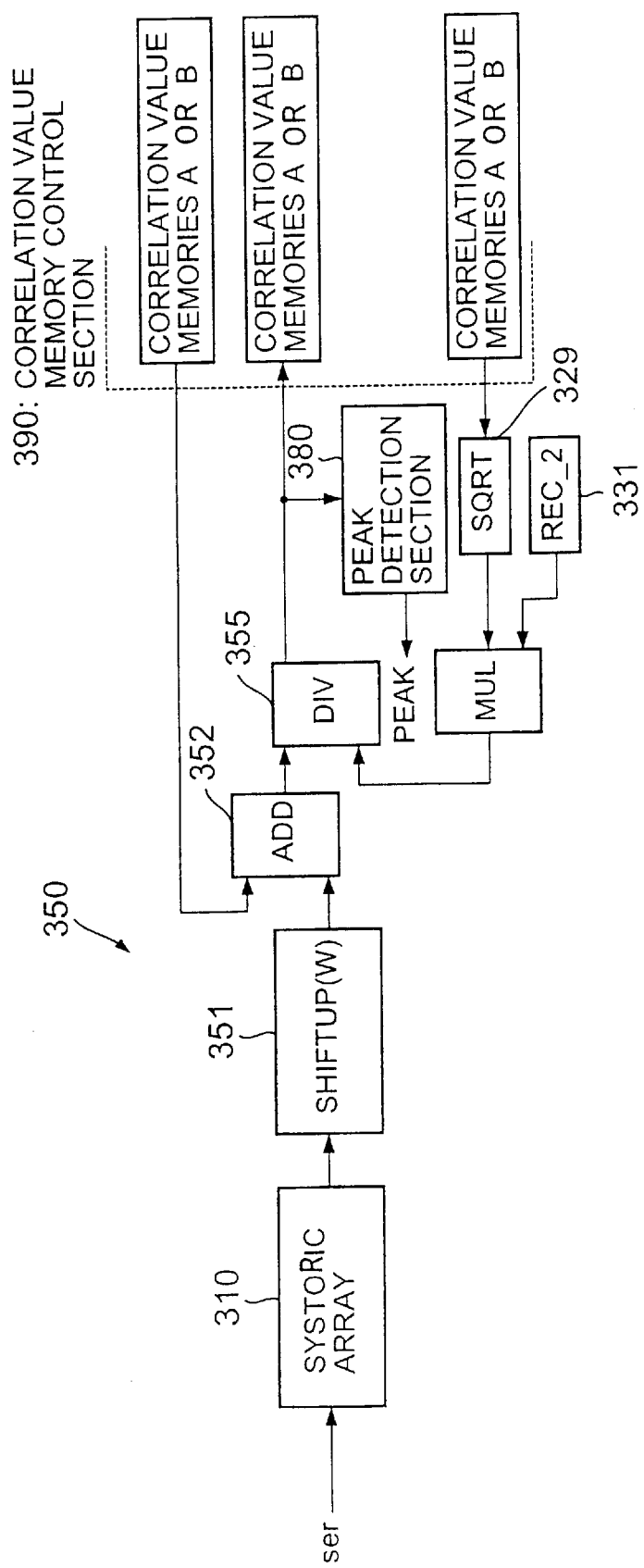
FIG. 27 is a block diagram useful for understanding a flow of processing of portions taking the normalization and accumulation processing section of the image processing section.
Figure 31:
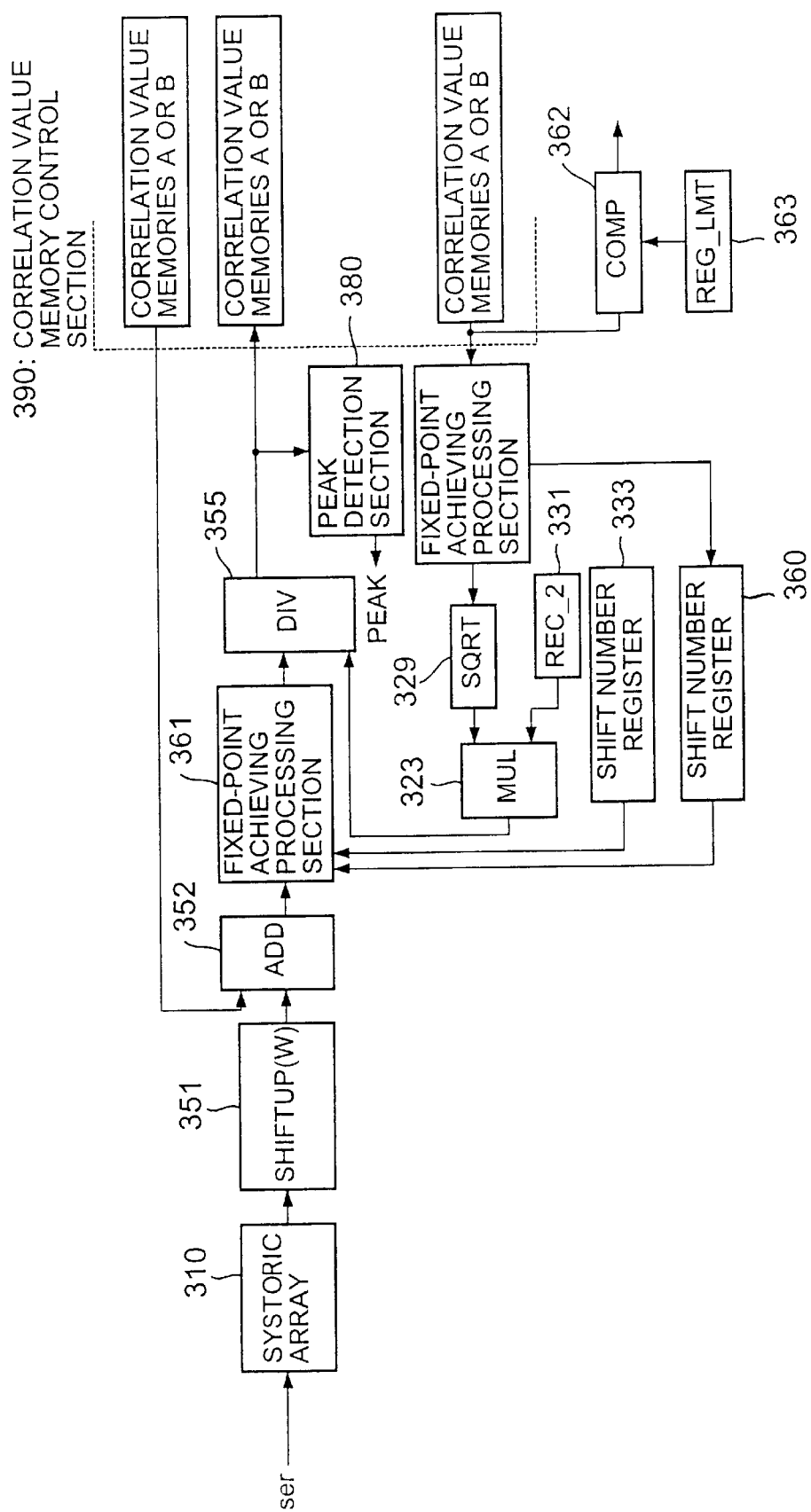
FIG. 31 is a block diagram of a normalization and accumulation processing section which can be adopted instead of the normalization and accumulation processing section shown in FIG. 27.
Figure 32:
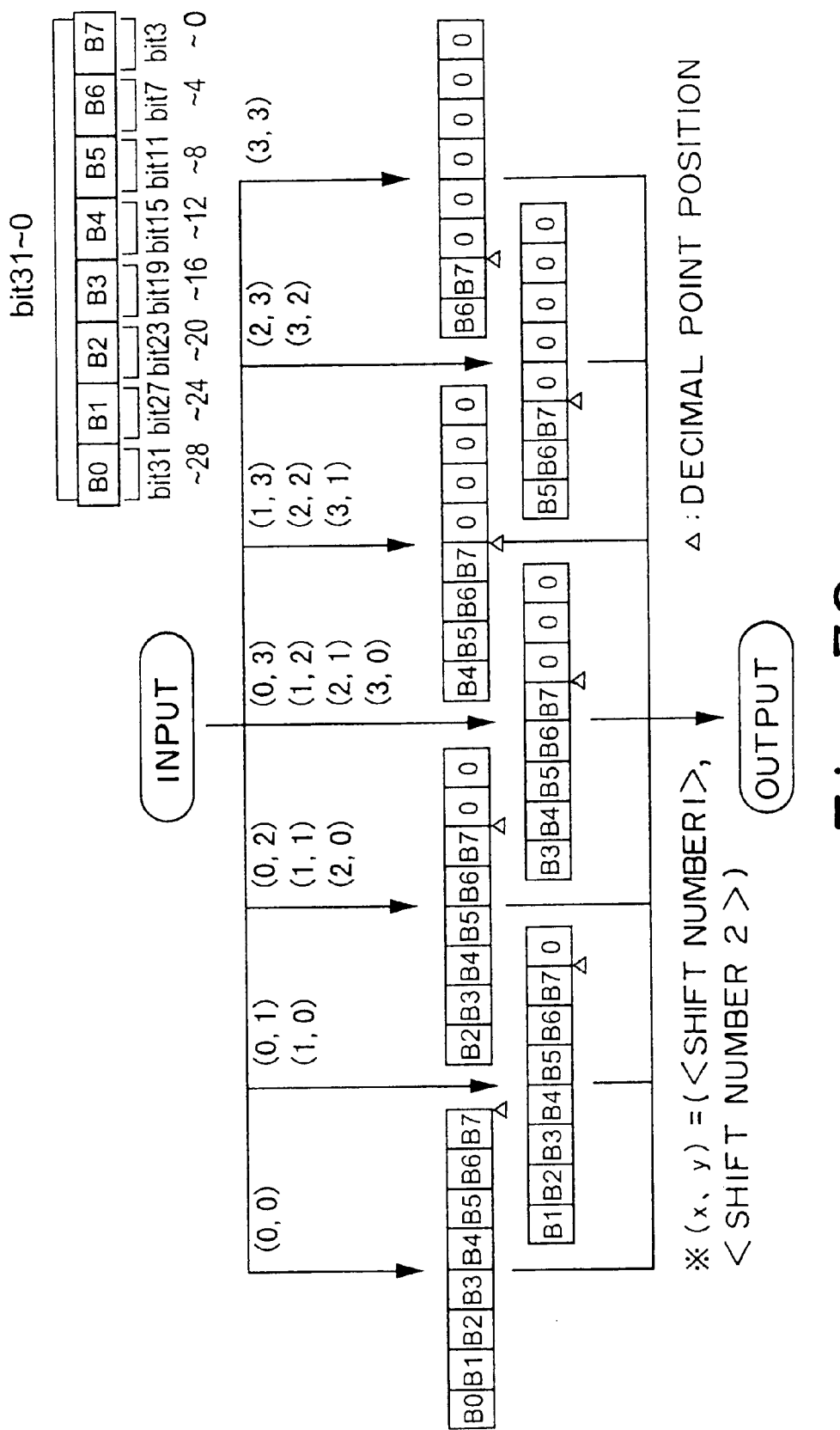
FIG. 32 is a functional explanatory view useful for understanding a third fixed-point achieving processing section.

FIG. 31 is a block diagram of a normalization and accumulation processing section which can be adopted instead of the normalization and accumulation processing section shown in FIG. 27. FIG. 32 is a functional explanatory view useful for understanding a third fixed-point achieving processing section 361.

The normalization and accumulation processing section shown in FIG. 31 is adopted together with the reference image norm computing section shown in FIG. 29. A different point between the normalization and accumulation processing section shown in FIG. 31 and the normalization and accumulation processing section shown in FIG. 27 is that the normalization and accumulation processing section shown in FIG. 31 is provided with a second fixed-point achieving processing section 359, a shift number register 360, a third fixed-point achieving processing section 361, a register 363 and a comparator 362. Another fixed-point achieving processing section 333 shown in FIG. 31 is just the fixed-point achieving processing section 333 in the reference image norm computing section shown in FIG. 29.

As explained referring to FIG. 27, the square root computing device 329 receives the additional value of the square value of the pixel value of the search image. On the other hand, according to the arrangement of FIG. 31, there is provided the second fixed-point achieving processing section 359 before the square root computing device 329. The second fixed-point achieving processing section 359 performs data shift according to the processing scheme identical to that explained referring to FIG. 30, with respect to the additional value of the square value of the pixel value of the search image, before entry of data to the square root computing device 329.

Index shift_idx=0, 1, 2, 3, which denotes an amount of data shift in the second fixed-point achieving processing section 359, is stored in the shift number register 360.

Thereafter, as described referring to FIG. 27, in accordance with the final operation after the partial operations for several numbers of time, the adder 352 outputs the additional value of the multiplication value of the pixel values of the pixels associated with the reference image and the search image and applies the same to the divider 355. The divider 355 performs the division corresponding to the above-mentioned formula (1). According to the arrangement of FIG. 31, the third fixed-point achieving processing section 361 is disposed between the adder 352 and the divider 355. The third fixed-point achieving processing section 361 shifts the output of the adder 352 in accordance with the index of the number of shift stored in two shift registers 333 and 360. This corresponds to that the numerator of the above-mentioned formula (1) is shifted by the amount of shift associated with the amount of data shift of the denominator.

That is, the third fixed-point achieving processing section 361, as shown in FIG. 32, outputs to the divider 355 without performing data shift when both two shift registers 333 and 360 store therein shift_idx=0 (this expressed by (0, 0) ). When it is concerned with (1, 0) ((1, 0) denotes that the shift register 333 stores shift_idx=1, and the shift register 360 stores shift_idx=0. This is the similar as to the matter of the following expressions), or (0, 1), the third fixed-point achieving processing section 361 performs 4 bit-shift to the upper significant bit side and outputs. When it is concerned with any one of (0, 2), (1, 1) and (2, 0), the third fixed-point achieving processing section 361 performs 8 bit-shift to the upper significant bit side and outputs. Hereafter similarly, when it is concerned with (3, 3), the third fixed-point achieving processing section 361 performs 24 bit-shift to the upper significant bit side and outputs.

In this manner, the divider 355 is able to perform the division with great accuracy, even if a divisor or a dividend is a small value.

Incidentally, the register 363 and the comparator 362, which are shown in FIG. 31, are for issuing an alarm when the value is too small, in a similar fashion to that of the register 335 and the comparator 334 explained referring to FIG. 29. Thus, the redundant description will be omitted.

Figure 33:
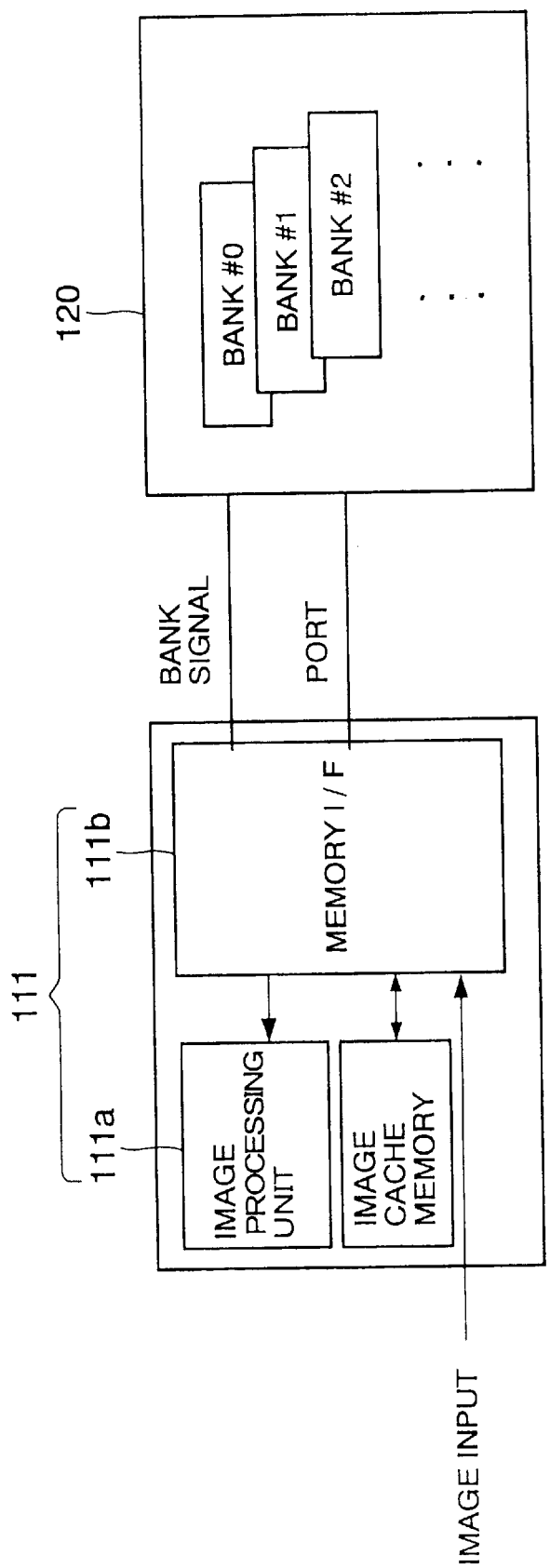
FIG. 33 is a typical illustration showing portions of a correlation image processing device 111, a cache memory 112 and an image memory 120, of the structure shown in FIG. 8.

FIG. 33 is a typical illustration showing portions of a correlation image processing device 111, a cache memory 112 and an image memory 120, of the structure shown in FIG. 8.

Inside the correlation image processing device 111 of FIG. 33, there is provided a main interface 111b for performing data transmission between the image memory 120 and the image processing section 111a and the cache memory 112.

The search image, which is entered through the external video encoder/decoder (cf. FIG. 8), is stored via the main interface 111b into the image memory 120. The image memory 120 is provided with a plurality of frame memory referred to as a "bank". Thus, the entered image is stored in each bank one frame-by-one frame by the main interface 111b using a plurality of banks on a circular basis. A bank to be used of the plurality of banks is selected in accordance with a bank signal. In this manner, it is possible to provide such an arrangement that the address line and the data line (port) are held in common among the banks, and thereby saving the number of wiring lines and the number of terminals when it is constructed in the form of an integrated circuit.

Figure 34:
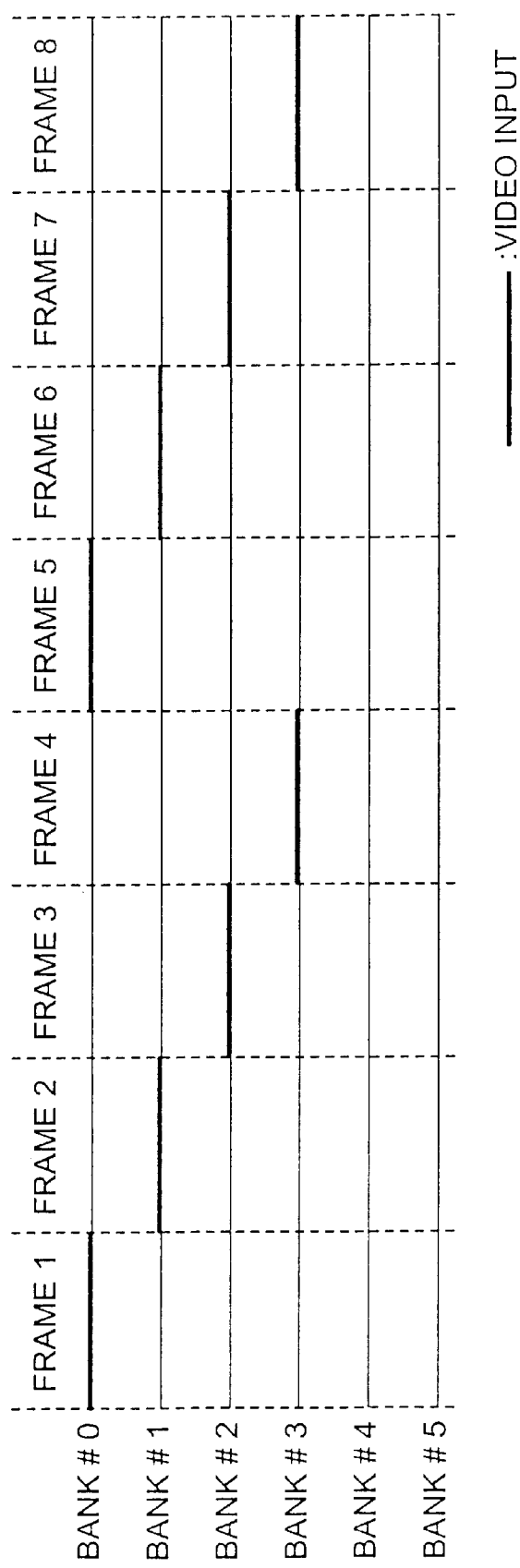
FIG. 34 is a typical illustration showing a state that an image is stored in an image memory.

FIG. 34 is a typical illustration showing a state that an image is stored in an image memory 120.

A first frame (frame 1) of the entered image is stored in #0, the subsequent frame (frame 2) is stored in the bank #1, and in turn, the frame 3 bank #2, and the frame 4 bank #3. Then, the process returns to the bank #0, and the frame 5 is stored in the bank #0 through overwriting on the frame 1. Frames 6, 7 and 8 are sequentially stored in the banks #1, #2 and #3, respectively on an overwriting basis. It is noted that the banks #4 and #5 are for storing reference images or the like which are not suitable for the circulating storage as mentioned above.

In this manner, always making sure of a plurality of past frames of image makes it possible to track objects to meet a movement of the object, even if an object involved in the fast movement and an object involved in the slow movement exist on the image on a mixing basis, using the correlation operation between the near frames for tracking the object involved in the fast movement and using the operation between the far frames for tracking the object involved in the slow movement.

Figure 35:
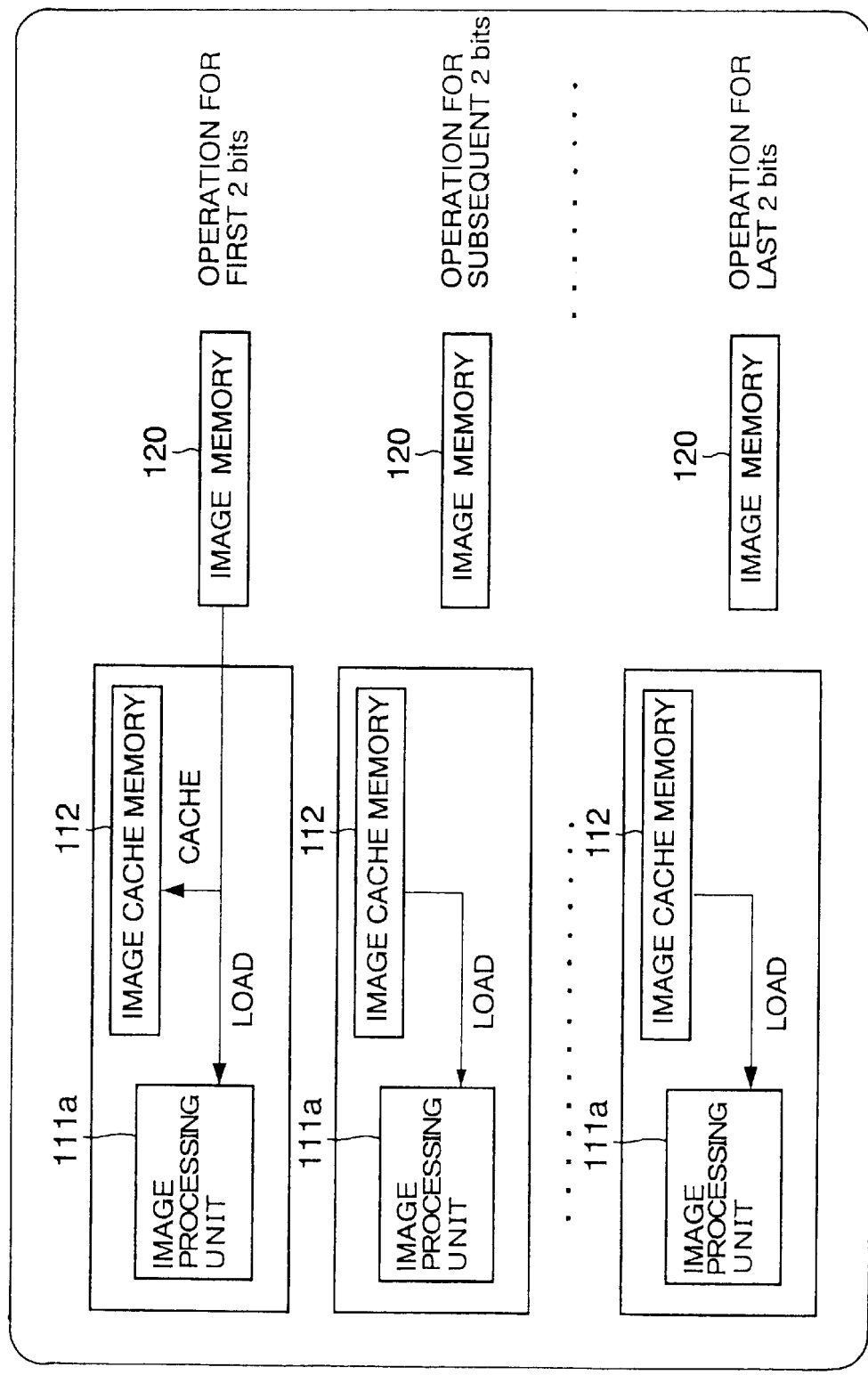
FIG. 35 is a typical illustration useful for understanding an image transfer method.

FIG. 35 is a typical illustration useful for understanding an image transfer method.

As described referring to FIGS. 33 and 34, the image entered from the exterior is stored once in the image memory 120. To perform an operation in the image processing section 111a, the image is read from the image memory 120.

As mentioned above, the systoric array 310 (cf. FIGS. 9 and 10) performs a partial operation between the pixel value (8 bits) and the bits (2 bits) of part of the pixel value. In some operation, a desired operation will be terminated through repetition of the partial operation. In such a case, as part (A) of FIG. 35, an image read from the image memory 120 by the memory interface 111b (cf. FIG. 33) is stored in the image cache memory 112, and further data necessary for the partial operation for the first time is fed to the image processing section 111a so that the partial operation for the first time is performed. With respect to the partial operations for the second time and more, as shown in parts (B) and (C) of FIG. 35, necessary data is read from the image cache memory 112 but not the image memory 120, by the memory interface 111b. The image cache memory 112 can be accessed directly from the image processing section 111a without passing through the bus of CPU. Thus, in the event that the image cache memory 112 is constructed with a high speed memory such as SRAM, it is possible to reduce the operation time by adopting the access scheme as shown in FIG. 35.

Figure 36:
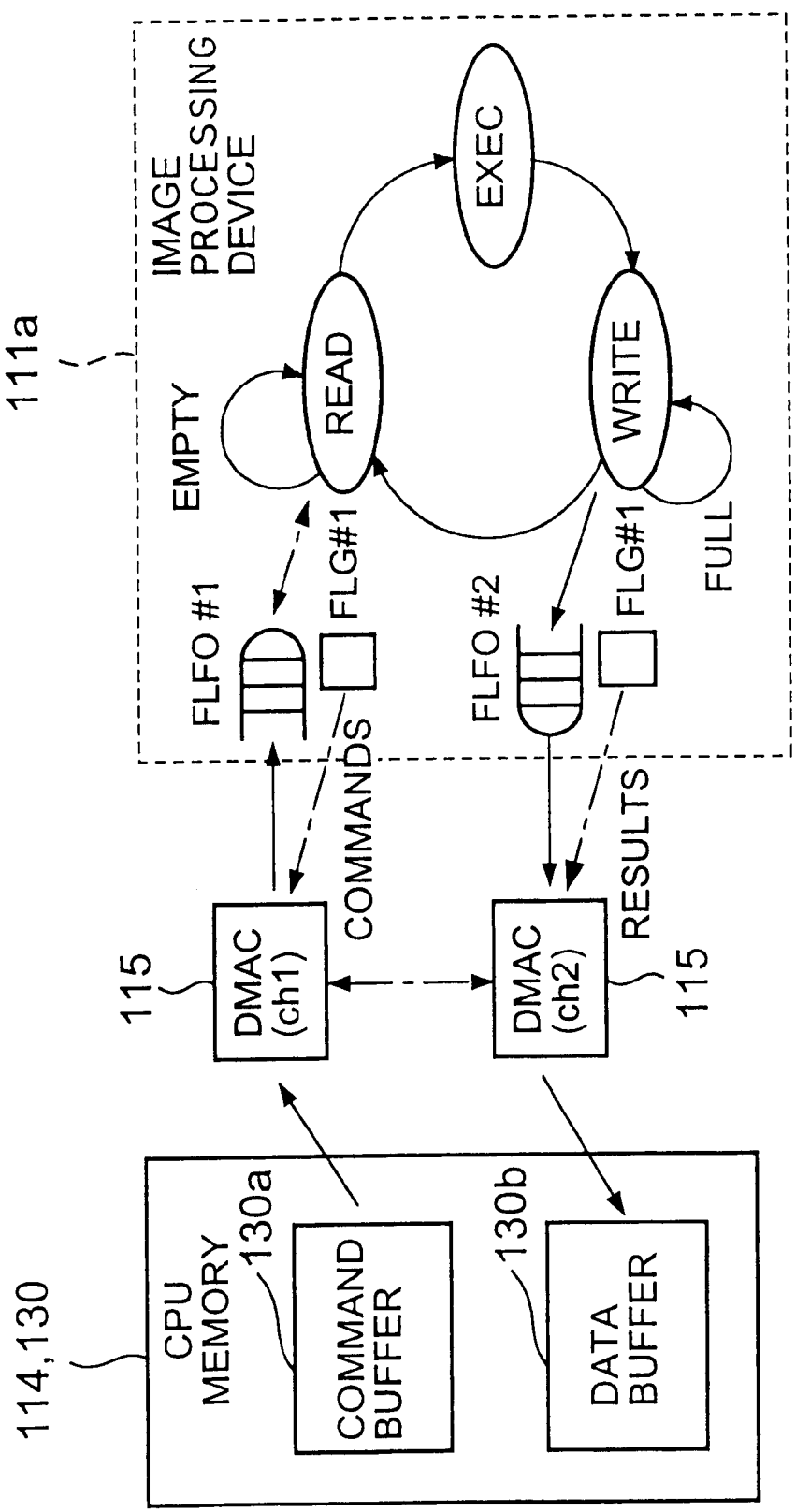
FIG. 36 is a typical illustration useful for understanding a transfer method between CPU and an image processing section through a control of the DMA controller in the structure shown in FIG. 8.

FIG. 36 is a typical illustration useful for understanding a transfer method between CPU 114 (including the memory 130) and the image processing section 111a through a control of the DMA controller 115 in the structure shown in FIG. 8.

Figure 1:
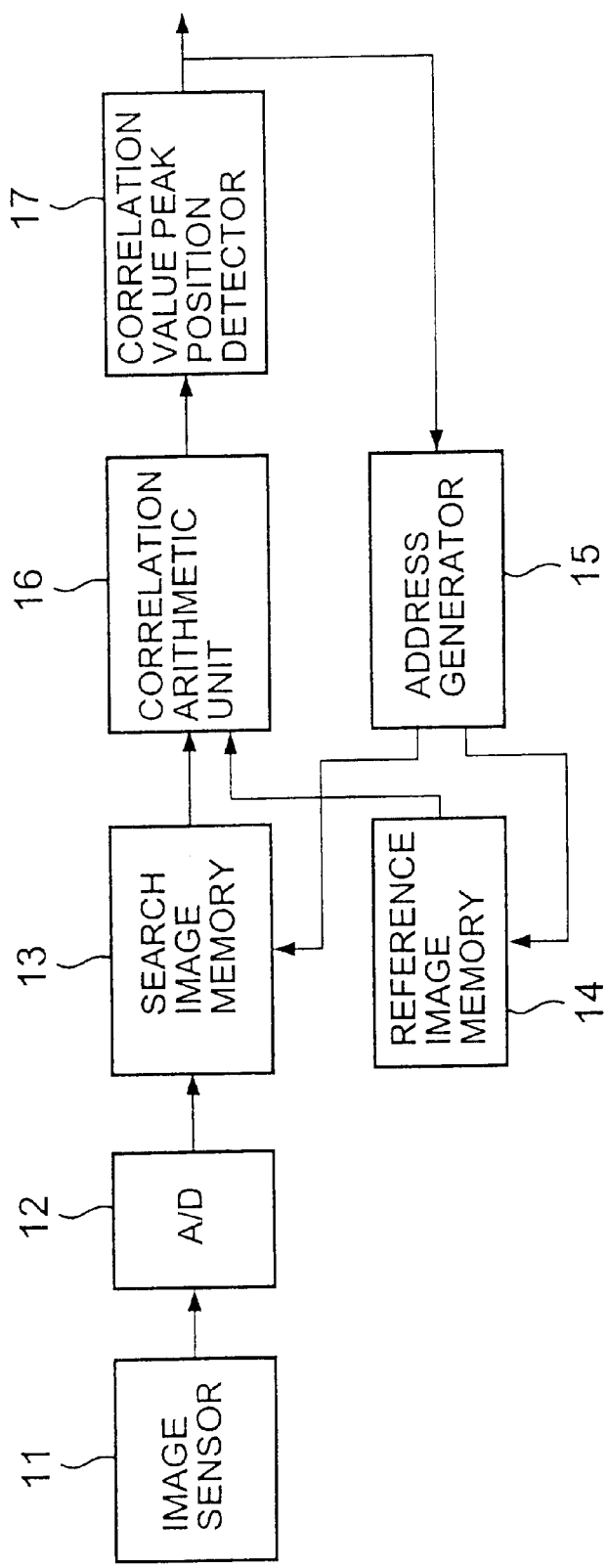
FIG. 1 is an explanatory view useful for understanding a principle of a movement tracking processing by a correlation arithmetic operation.
Figure 2:
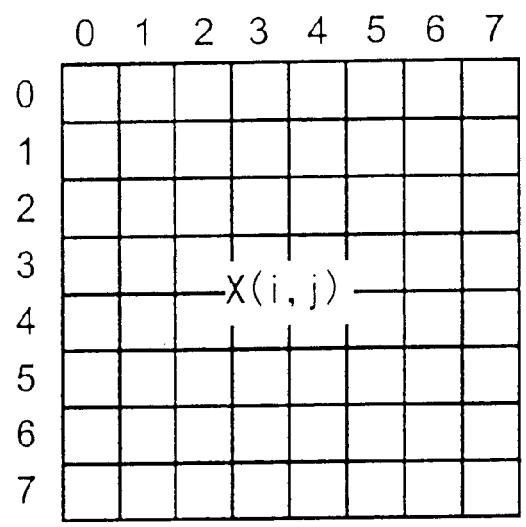
FIG. 2 is a view representative of a pixel division of a reference image.
Figure 3:
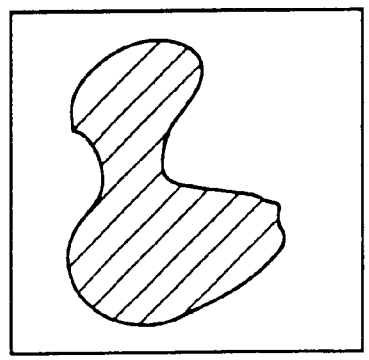
FIG. 3 is a view showing an example of a pattern on the reference image.
Figures 4, 5:
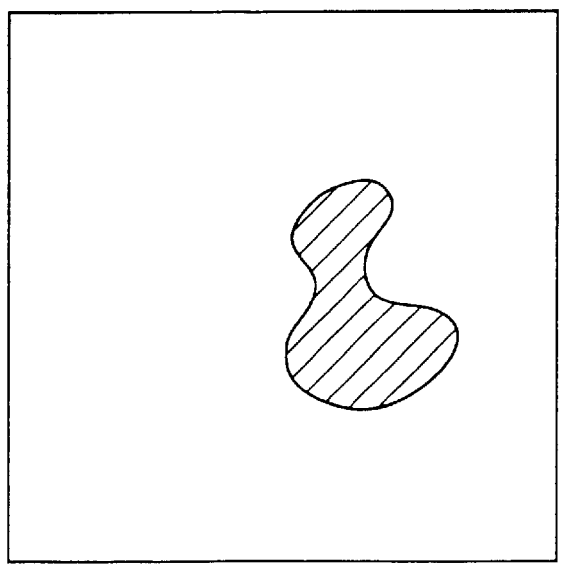
FIG. 4 is a view representative of a pixel division of a search image.
FIG. 5 is a view showing an example of a pattern on the search image.
Figure 6:
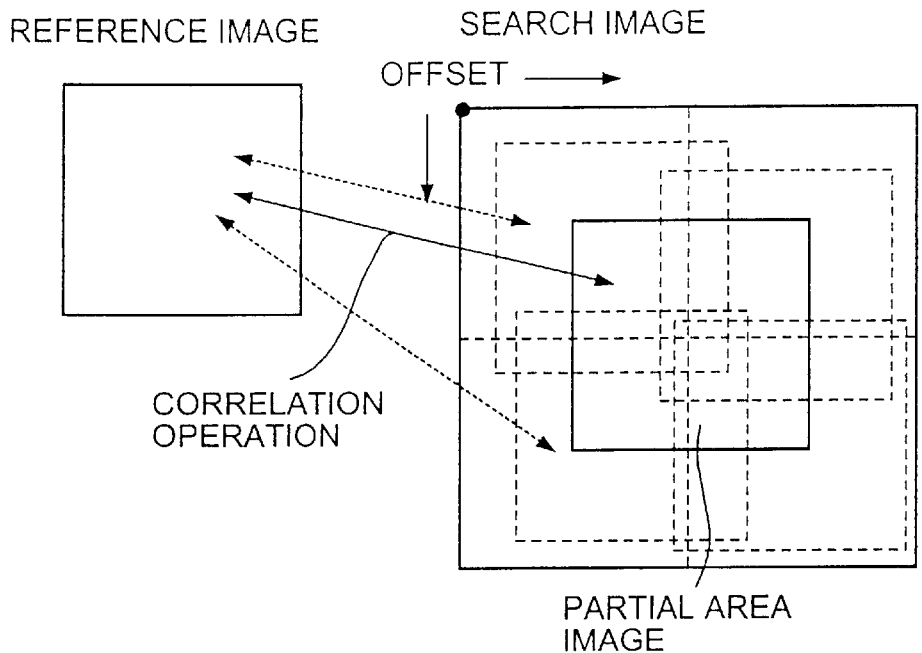
FIG. 6 is an explanatory view useful for understanding a correlation arithmetic processing between the reference image and the search image.
Figure 7:
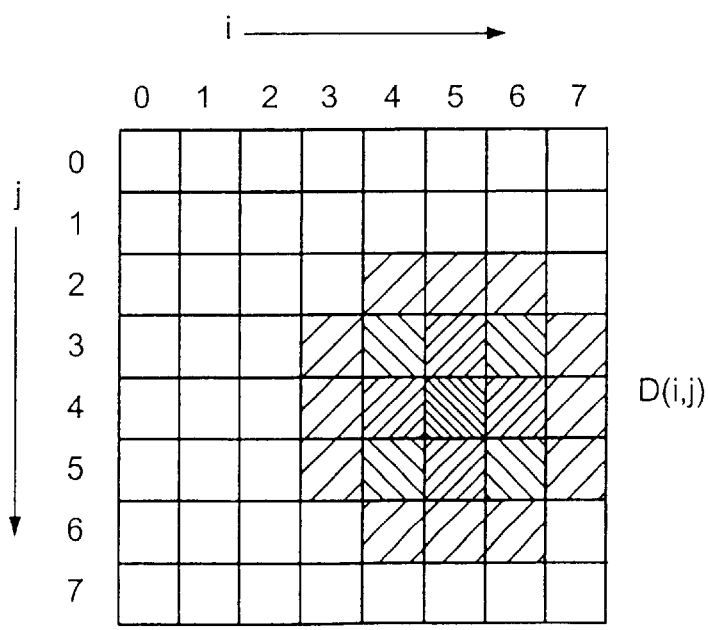
FIG. 7 is a typical illustration showing a distribution of correlation values.

The DMA controller 115 has a two-channel structure in which a first channel (ch1) serves to transfer an operation command (including data such as constants necessary for the operation) from the CPU side to the image processing section 111a, and a second channel (ch2) serves to transfer an operation result in the image processing section 111a to the CPU side. That is, the first channel (ch1) of the DMA controller 115 transfers the operation command, which is stored in the command buffer 130a of the CPU end, to FIFO#1 (First-in First-out memory) of the image processing section 111a, and the second channel (ch2) of the DMA controller 115 transfers the operation result, which is stored in another FIFO#2 in the image processing section 111a, to the data buffer 130b of the CPU end. Here, as shown in FIG. 1, both the transfer of the operation command and the transfer of the operation result are performed via the common bus 113. Consequently, both the transfer of the operation command and the transfer of the operation result are performed are not performed simultaneously, and are performed on a time division basis while the right to use the bus is transferred between the first channel and the second channel.

As typically shown in the block of the image processing section 111a of FIG. 36, the image processing section 111a repeatedly performs such an operation that the operation command, which is stored in the FIFO# 1, is derived (Read), executes the operation according to the operation command (Exec), writes the operation result into FIFO#2 (Write), and thereafter reads out the subsequent operation command from the FIFO#1. In this case, when the FIFO#1 is empty (Empty), the subsequent operation cannot be executed, and thus in the step of read (Read) of the operation command from the FIFO#1, the stand-by state offers. When the FIFO#2 is full (Full), it is difficult to write the operation result into the FIFO#2, and thus in the step of write of the operation result into the FIFO#2, the stand-by state offers.

Figure 37:
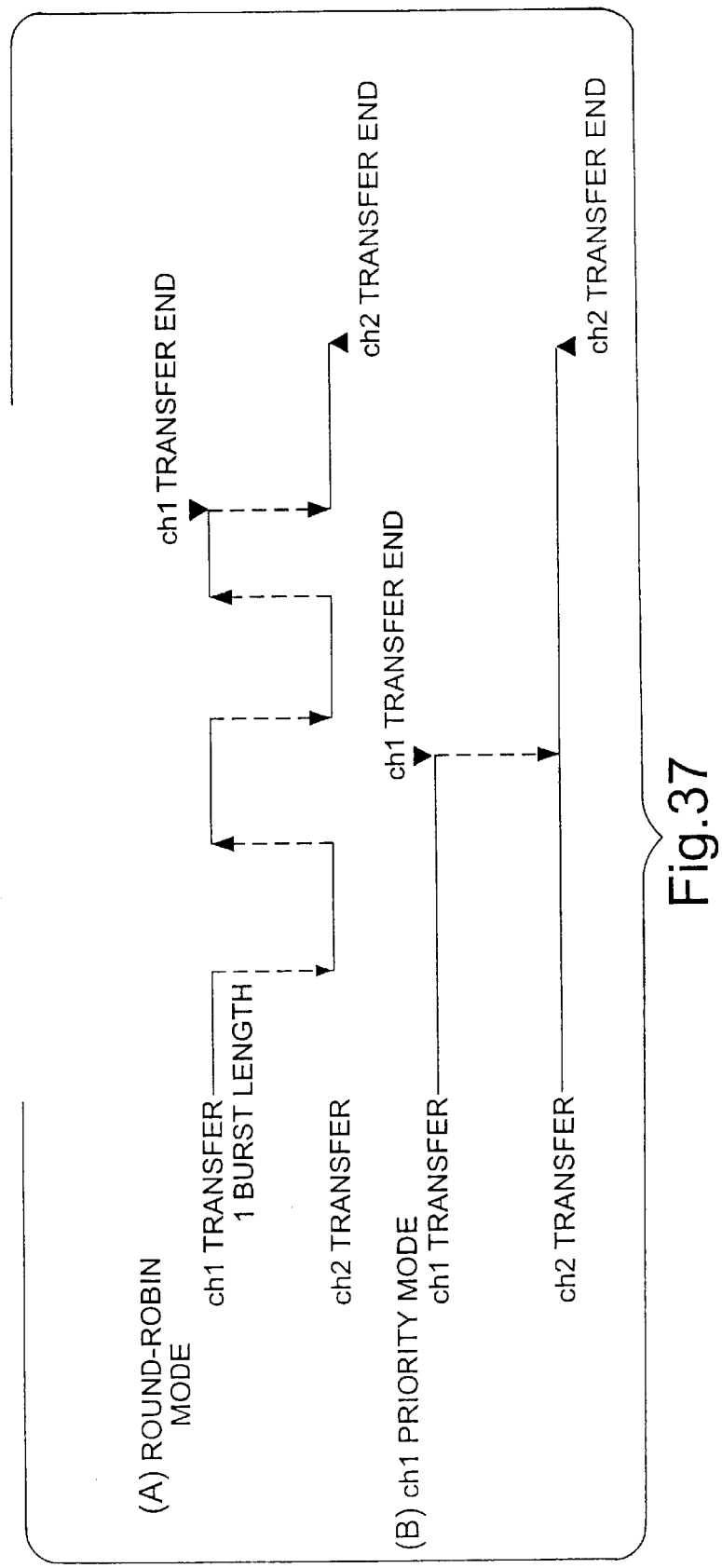
FIG. 37 is a timing chart useful for understanding a conventional method (a comparison example) of a movement of the right to use the bus between channels of the DMA controller

FIG. 37 is a timing chart useful for understanding a conventional method (a comparison example) of a movement of the right to use the bus between channels of the DMA controller.

As transfer modes for the right to use the bus, typically, there are two modes of a round-robin mode (A) and another mode (here, a ch1 priority mode (B) in which a priority is applied to the first channel).

In the round-robin, as shown in part (A) of FIG. 37, whenever one channel transfers a predetermined data number (one burst length) of data, the right to use the bus is transferred to another channel. In this case, in timing that a burst length of data is transferred in one channel, or no data to be transferred in the channel exists, the right to use the bus is transferred to another channel.

In the ch1 priority mode (B), as shown in part (A) of FIG. 37, the first channel (ch1) has the priority of the right to use the bus, and in timing that no data to be transferred in the first channel ch1 exists, the right to use the bus is transferred to another channel ch2.

Here, in both the round-robin mode (A) and the ch1 priority mode (B), it is considered that when the first channel has the right to use the bus, the FIFO#2 storing the operation result as shown in FIG. 36 is full.

In such a situation, the image processing section 111a cannot perform the operation any longer and offers the stand-by state. In this condition, when the first channel continues to transfer further the operation command to the FIFO#1, then the FIFO#1 will be also full. However, in the event that the first channel does not yet complete the transfer of a burst length of operation command (in case of the round-robin mode) or all of the operation commands (in case of the ch1 priority mode), the first channel intends to further transfer the operation command (but it is impossible to transfer the operation command since the FIFO#1 is full) and offers a deadlock state in which the operation command cannot be transferred any longer.

This deadlock state occurs also when the second channel has the right to use the bus.

That is, when the second channel derives the operation result from the FIFO#2 and transfers the same to the CPU end, the FIFO#1 becomes empty, then the image processing section 111a performs no longer the operation and the FIFO#2 will become also empty, and thus the deadlock occurs.

In view of the foregoing, according to the present embodiment, the image processing section 111a is provided with flag registers FLG#1 and #2 associated with the FIFO#1 and #2, respectively. The flag register FLG#1 associated with the FIFO#1 stores therein a flag indicating whether the FIFO#1 becomes empty. The flag register FLG#2 associated with FIFO#2 stores therein a flag indicating whether the FIFO#2 becomes full.

Figure 38:
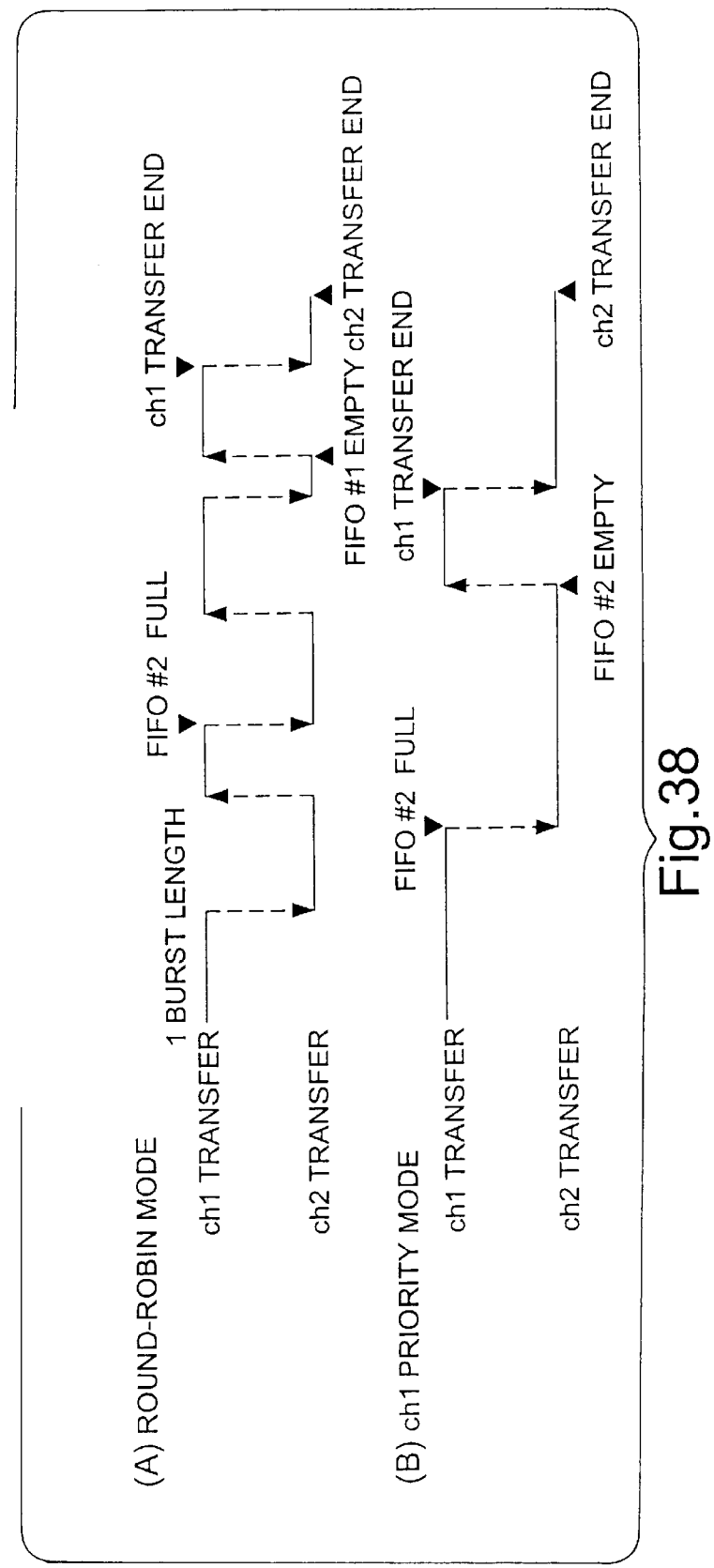
FIG. 38 is a timing chart useful for understanding a method of a movement of the right to use the bus according to the present embodiment.

FIG. 38 is a timing chart useful for understanding a method of a movement of the right to use the bus according to the present embodiment.

In the round-robin mode of a part (A) of FIG. 38, in the event that the transfer of a burst length of data is completed, and in the event that no data to be transferred in the channel exists, and in addition in the event that the first channel (ch1) still performs the transfer, the right to use the bus is transferred to the second channel (ch2) in timing that a flag indicating that the FIFO#2 becomes full is established on the flag register FLG#2 associated with the FIFO#2. When the right to use the bus is provided for the second channel (ch2), the right to use the bus is transferred to the first channel (ch1) in timing that a flag indicating that the FIFO#1 becomes empty is established on the flag register FLG#1 associated with the FIFO#1.

This is similar as to the matter of the ch1 priority mode in part (B) of FIG. 38. When the first channel (ch1) has the right to use the bus, the right to use the bus is transferred to the second channel (ch2) not only in timing that all of data to be transferred in the first channel is completely transferred, but also in timing that the FIFO#2 becomes full. When the second channel (ch2) has the right to use the bus, the right to use the bus is transferred to the first channel (ch1) in timing that the FIFO#1 becomes empty.

Figure 39:
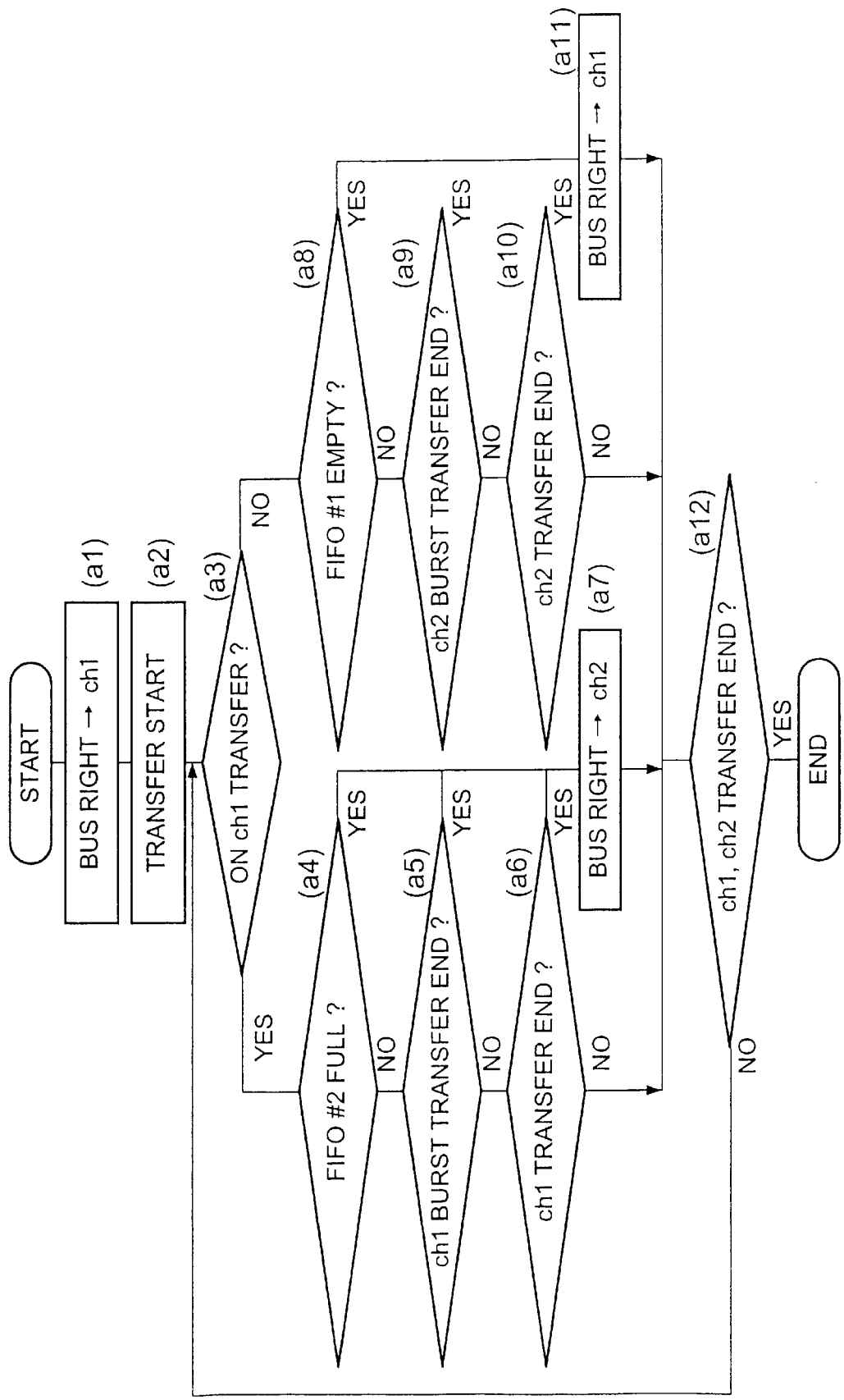
FIG. 39 is a flowchart useful for understanding a data transfer method in a round robin mode.

FIG. 39 is a flowchart useful for understanding a data transfer method in a round robin mode.

In the first step al, the right to use the bus is applied to the first channel (ch1). In the second step a2, data transfer (transmission of operation commands) is initiated.

During data transfer by the first channel (ch1) in the step a3, in any case that the FIFO#2 becomes full (step a4), the transfer of a burst length of operation command is terminated (step a5), or no data to be transferred through the first channel exists (step a6), the right to use the bus is transferred to the second channel (ch2) in step a7. Likewise, when the second channel (ch2) has the right to use the bus and performs the data transfer (transmission of the operation result) in step a3, in any case that the FIFO#1 becomes empty (step a8), the transfer of a burst length of data transfer is terminated (step a9), or no data to be transferred through the second channel exists (step a10), the right to use the bus is transferred to the first channel (ch1) in step a11.

When any one of the first channel and the second channel completes the data transfer (step a12), the process passes through this routine. On the other hand, when both the first channel and the second channel does not complete the data transfer, the process returns to the step a3.

Figure 40:
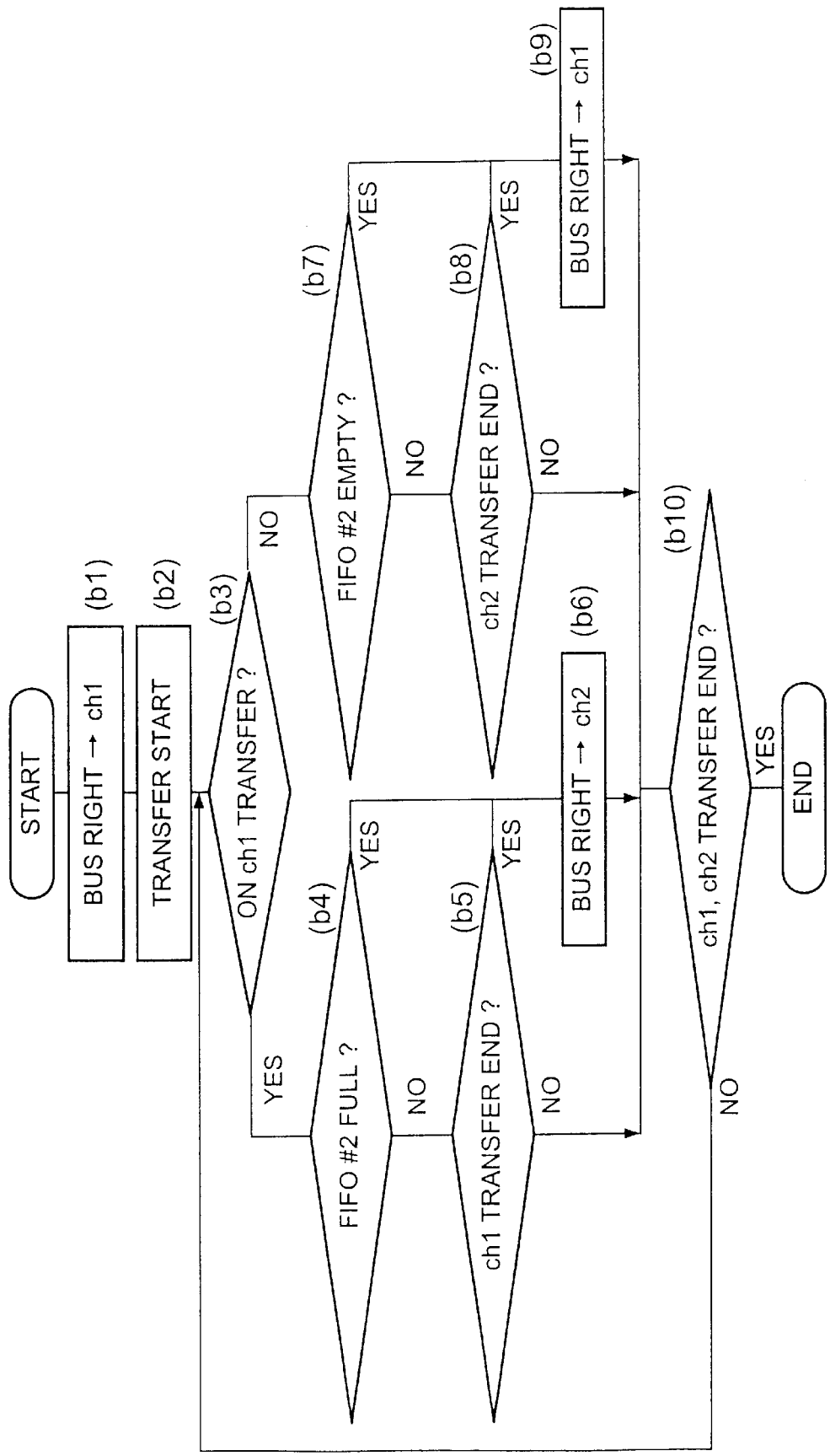
FIG. 40 is a flowchart useful for understanding a data transfer method in a ch1 priority mode.

FIG. 40 is a flowchart useful for understanding a data transfer method in the ch1 priority mode in part (B) of FIG. 38.

In the first step b1, the right to use the bus is applied to the first channel (ch1). In the second step b2, data transfer (transmission of operation commands) is initiated.

During data transfer by the first channel (ch1) in the step b3, in any case that the FIFO#2 becomes full (step b4), or no data to be transferred through the first channel exists (step b5), the right to use the bus is transferred to the second channel (ch2). When the second channel (ch2) performs the data transfer (transmission of the operation result) in step b3, in any case that the FIFO#1 becomes empty (step b7), or no data to be transferred through the second channel exists (step b8), the right to use the bus is transferred to the first channel (ch1) in step b9.

When any one of the first channel and the second channel completes the data transfer (step b10), the process passes through this routine. On the other hand, when both the first channel and the second channel does not complete the data transfer, the process returns to the step b3.

In this manner, according to the present embodiment, in both the round-robin mode shown in FIG. 39 and the ch1 priority mode shown in FIG. 40, in the event that the first channel has the right to use the bus, when the FIFO#2 becomes full, the right to use the bus is transferred to the second channel. On the other hand, in the event that the second channel has the right to use the bus, when the FIFO#1 becomes empty, the right to use the bus is transferred to the first channel. Thus, it is possible to avoid the above-mentioned deadlock and thereby performing a smooth transfer of data.

As mentioned above, according to the present invention, it is possible to implement an image processing unit capable of reducing a circuit scale and performing a normalization correlation with great accuracy and thereby contributing to the above-mentioned various fields such as visualization of movement measurement and movement vector of non-contact, camera control of movie photography and sport relay broadcasting, control of mobile robot and autonomic traveling car.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An image processing unit for performing an arithmetic operation between a reference image and a search image, upon receipt of the reference image and the search image, said image processing unit having an image processing section comprising:
a first multiplication section for computing a square of a pixel value of the reference image;
an addition section for adding square value of the pixel values of the reference image obtained by said first multiplication section over a plurality of pixels;
a first square root computing section for computing a square root of an additional value over a plurality of pixels of the square value of the pixel values of the reference image obtained by said addition section to determine a norm of the reference image;
a product-sum operation section used on a common basis for both an addition of square values of pixel values of the search image over a plurality of pixels and an addition of multiplication values of pixel values of pixels associated with the search image and the reference image over a plurality of pixels;
a second square root computing section for computing a square root of an additional value over a plurality of pixels of the square value of the pixel values of the search image obtained by said product-sum operation section to determine a norm of the search image;
a second multiplication section for multiplying the norm of the reference image obtained by said first square root computing section and the norm of the search image obtained by said second square root computing section together; and
a division section for dividing an additional value of multiplication values of pixel values of pixels associated with the search image and the reference image over a plurality of pixels obtained by said product-sum operation section by a multiplication value between the norm of the reference image and the norm of the search image obtained by said second multiplication section to obtain a normalization correlation value.

2. An image processing unit according to claim 1, wherein said first multiplication section and said second multiplication section are used on a common basis by a single multiplication section.

3. An image processing unit according to claim 1, wherein said first square root computing section and said second square root computing section are used on a common basis by a single square root computing section.

4. An image processing unit according to claim 1, wherein said product-sum operation section has a mode in which instead of the addition of multiplication values of pixel values of pixels associated with the search image and the reference image over a plurality of pixels, an addition of absolute values of differences between pixel values of pixels associated with the search image and the reference image over a plurality of pixels is performed.

5. An image processing unit according to claim 1, wherein said division section has a mode in which instead of a division by a multiplication value between the norm of the reference image and the norm of the search image obtained, a division is performed by a predetermined constant.

6. An image processing unit according to claim 5, wherein said image processing section further comprises an absolute value computing section for computing an absolute value of a value obtained by said division section.

7. An image processing unit according to claim 1, wherein said image processing section further comprises a peak detection section for detecting a peak position on the search image as to the normalization correlation value obtained by said division section.

8. An image processing unit according to claim 7, wherein said product-sum operation section has a mode in which instead of the addition of multiplication values of pixel values of pixels associated with the search image and the reference image over a plurality of pixels, an addition of absolute values of differences between pixel values of pixels associated with the search image and the reference image over a plurality of pixels is performed, and said peak detection section detects a peak position on the search image as to the addition of absolute values in said mode.

9. An image processing unit according to claim 1, wherein said product-sum operation section has a systoric array for performing an operation between all of a plurality of bits representative of one pixel value when pixel values are expressed by a plurality of bits, and a part of bits belonging to one group when a plurality of bits representative of another pixel value is divided into a plurality of groups, and said systoric array assembles an operation result between said one pixel value and said another pixel value in accordance with a plurality of operation results obtained through a sequential operation on said plurality of groups.

10. An image processing unit according to claim 1, wherein said image processing section further comprises:
   a first fixed-point achieving processing section for providing such a processing that when the additional value of the square value of the pixel values of the reference image over a plurality of pixels, which are obtained by said addition section, is such a small value that zeros are put at an upper significant bit end of a plurality of bits representative of the additional value, the additional value represented by the plurality of bits is shifted to the upper significant bit end so that a decimal point position is shifted to the upper significant bit end to transfer the same to said first square root computing section;
   a second fixed-point achieving processing section for providing such a processing that when the additional value of the square value of the pixel values of the search image over a plurality of pixels, which are obtained by said product-sum operation section, is such a small value that zeros are put at an upper significant bit end of a plurality of bits representative of the additional value, the additional value represented by the plurality of bits is shifted to the upper significant bit end so that a decimal point position is shifted to the upper significant bit end to transfer the same to said second square root computing section; and
   a third fixed-point achieving processing section for providing such a processing that the additional value of multiplication values of pixel values of pixels associated with the search image and the reference image over a plurality of pixels, which are obtained by said product-sum operation section, said additional value being expressed by a plurality of bits, is shifted to the upper significant bit end by a shift amount according to a shift amount in said first fixed-point achieving processing section and a shift amount in said second fixed-point achieving processing section so that a decimal point position is shifted to the upper significant bit end to transfer the same to said division section.

11. An image processing unit according to claim 1, wherein said image processing section repeats by a plurality of number of times a partial operation according to a part of data of data representative of the reference image and the search image so that an operation according to the reference image and the search image are completed,
   and wherein said image processing section further comprises:
      a cache memory for storing the search image; and
      a memory control section for providing such a control that while data representative of the search image is stored in said cache memory, data necessary for a partial operation for the first time of data representative of the search image is transferred to said image processing section, and with respect to two or more partial operations based on the same search image, necessary data is read from said cache memory to transfer the same to said image processing section.

12. An image processing unit according to claim 1, wherein said image processing unit further comprises a image memory having a plurality of frame memories each for storing a frame of search image, and a memory control section for providing such a control that the plurality of frame memories are used on a circulation basis so that an entered search image is stored in each of the frame memories one frame by one frame.

13. An image processing unit according to claim 1, wherein said image processing section comprises an operation command storage section for sequentially storing a plurality of operation commands, and an operation result storage section for sequentially storing a plurality of operation results, and said image processing section derives the operation command from said operation command storage section to perform an arithmetic operation in accordance with the operation command and causes a result of the arithmetic operation to be stored in said operation result storage section,
   said image processing unit further comprises an image processing control section having two modes of a first mode in which the operation command is fed to said image processing section so as to be stored in said operation command storage section, and a second mode in which the operation result stored in said operation result storage section is derived, and
   said image processing control section changes over from the first mode to the second mode when said operation result storage section is full, and changes over from the second mode to the first mode when said operation command storage section is empty.

* * * * *

UNITED STATES PATENT AND TRADEMARK OFFICE
CERTIFICATE OF CORRECTION

PATENT NO. : 6,721,462 B2
DATED : April 13, 2004
INVENTOR(S) : Keiju Okabayashi et al.

It is certified that error appears in the above-identified patent and that said Letters Patent is hereby corrected as shown below:

Column 28,
Line 21, change "a" to -- an --.

Signed and Sealed this

Twenty-ninth Day of June, 2004

JON W. DUDAS
*Acting Director of the United States Patent and Trademark Office*